(12) United States Patent
Zhu et al.

(10) Patent No.: US 12,287,349 B2
(45) Date of Patent: Apr. 29, 2025

(54) VIBRATION-TYPE MEASURING TRANSDUCER AND VIBRONIC MEASURING SYSTEM FORMED THEREWITH

(71) Applicant: Endress+Hauser Flowtec AG, Reinach (CH)

(72) Inventors: Hao Zhu, Freising (DE); Alfred Rieder, Landshut (DE); Ennio Bitto, Aesch (CH); Gerhard Eckert, Grenzach-Wyhlen (DE)

(73) Assignee: Endress+Hauser Flowtec AG, Reinach (CH)

( * ) Notice: Subject to any disclaimer, the term of this patent is extended or adjusted under 35 U.S.C. 154(b) by 74 days.

(21) Appl. No.: 16/956,573

(22) PCT Filed: Nov. 15, 2018

(86) PCT No.: PCT/EP2018/081298
§ 371 (c)(1),
(2) Date: Jun. 20, 2020

(87) PCT Pub. No.: WO2019/120780
PCT Pub. Date: Jun. 27, 2019

(65) Prior Publication Data
US 2021/0123845 A1    Apr. 29, 2021

(30) Foreign Application Priority Data
Dec. 22, 2017   (DE) .................... 10 2017 131 187.4

(51) Int. Cl.
*G01N 9/00*    (2006.01)
*G01F 1/84*    (2006.01)
(Continued)

(52) U.S. Cl.
CPC ........... *G01N 9/002* (2013.01); *G01F 1/8422* (2013.01); *G01F 1/8427* (2013.01);
(Continued)

(58) Field of Classification Search
CPC ...... G01N 29/222; G01N 11/16; G01N 9/002; G01N 29/02; G01N 2009/006;
(Continued)

(56) References Cited

U.S. PATENT DOCUMENTS 8,613,228 B2* 12/2013 Hussain ................ G01F 1/8477
73/861.355
2011/0167907 A1* 7/2011 Bitto ...................... G01F 15/02
73/32 A
(Continued)

FOREIGN PATENT DOCUMENTS

CN    102472653 A    5/2012
CN    102667421 A    9/2012
(Continued)

OTHER PUBLICATIONS

Klein, Einführung in die DIN-Norman, Jan. 1, 1993, XP055452202, pp. 286-290.

*Primary Examiner* — John Fitzgerald
*Assistant Examiner* — Truong D Phan
(74) *Attorney, Agent, or Firm* — Kelly J. Smith; Endress+Hauser (USA) Holding, Inc.

(57) ABSTRACT

A measuring transducer includes a tube arrangement having a bent tube, an equally embodied tube, a bent tube and a tube embodied equally to the tube, and two flow dividers each having four flow openings. The measuring transducer includes an exciter for exciting and maintaining mechanical oscillations of the tube arrangement and a sensor for registering mechanical oscillations of the tube arrangement and for producing oscillation measuring signals. Each tube is
(Continued)

connected to each flow divider to form four parallel flow paths, having a straight segment connected with the flow divider, an arc shaped segment following such straight segment, a straight segment following such arc shaped segment, an arc shaped segment following such straight segment, a straight segment following such arc shaped segment, an arc shaped segment following such straight segment, and a straight segment following such arc shaped segment and is connected with the flow divider.

2 Claims, 10 Drawing Sheets

(51) Int. Cl.
   *G01F 15/14* (2006.01)
   *G01F 15/18* (2006.01)
   *G01N 11/16* (2006.01)

(52) U.S. Cl.
   CPC ............ *G01F 1/8477* (2013.01); *G01F 15/14* (2013.01); *G01F 15/18* (2013.01); *G01N 11/16* (2013.01); *G01N 2009/006* (2013.01)

(58) Field of Classification Search
   CPC .... G01F 15/02; G01F 25/0007; G01F 1/8413; G01F 1/8477; G01F 15/14; G01F 15/18; G01F 1/8422; G01F 1/8427
   See application file for complete search history.

(56) References Cited

U.S. PATENT DOCUMENTS

| | | |
|---|---|---|
| 2012/0192658 A1 | 8/2012 | Hussain et al. |
| 2013/0283932 A1 | 10/2013 | Ricken et al. |
| 2017/0261474 A1 | 9/2017 | Zhu et al. |

FOREIGN PATENT DOCUMENTS

| | | |
|---|---|---|
| CN | 103119405 A | 5/2013 |
| CN | 103562689 A | 2/2014 |
| CN | 103900652 A | 7/2017 |
| CN | 107110686 A | 8/2017 |
| DE | 102011006971 A1 | 10/2012 |
| WO | 2011009683 A1 | 1/2011 |
| WO | 2016107694 A1 | 7/2016 |

* cited by examiner

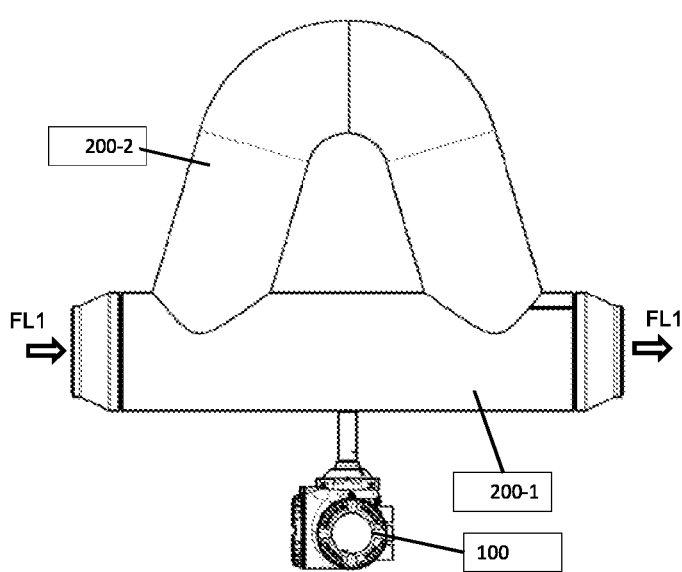
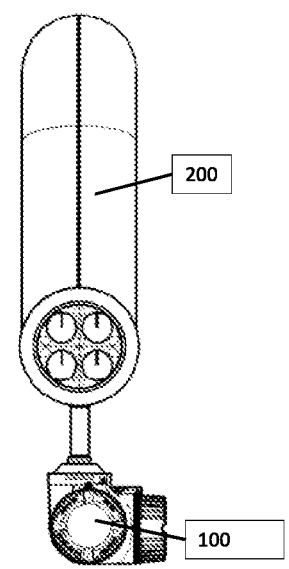
FIG. 2A
FIG. 2B

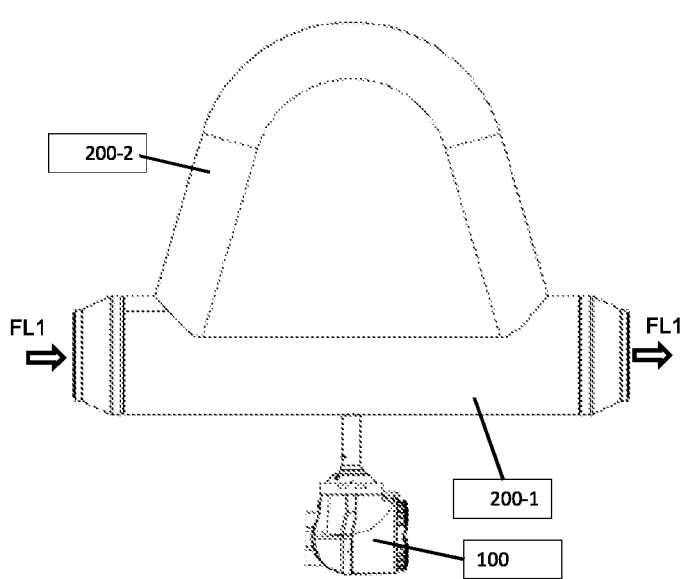 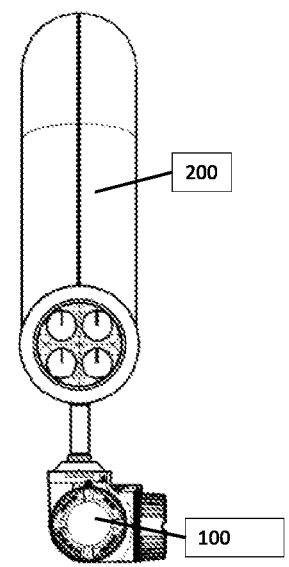
FIG. 5A
FIG. 5B

VIBRATION-TYPE MEASURING TRANSDUCER AND VIBRONIC MEASURING SYSTEM FORMED THEREWITH

CROSS-REFERENCE TO RELATED APPLICATIONS

The present application is related to and claims the priority benefit of German Patent Application No. 10 2017 131 187.4, filed on Dec. 22, 2017 and International Patent Application No. PCT/EP2018/081298, filed on Nov. 15, 2018, the entire contents of which are incorporated herein by reference.

TECHNICAL FIELD

The invention relates to a measuring transducer, especially a measuring transducer suitable for a vibronic measuring system serving for measuring at least one measured variable of a flowing fluid, comprising a tube arrangement formed by means of four only pairwise equally embodied, bent tubes as well as two flow dividers having, in each case, four flow openings, as well as to a vibronic measuring system formed by means of such a measuring transducer and serving for measuring at least one measured variable, for example, a flow parameter, such as a mass flow rate or a volume flow rate, or a substance parameter, such as a density or a viscosity, of a flowing fluid. Additionally, the invention relates to a vibronic measuring system formed with such a measuring transducer.

BACKGROUND

Used in industrial measurements technology—especially also in connection with the control and monitoring of automated production processes—for highly accurate ascertaining of a mass flow rate of a medium, for example, a liquid, a gas or a dispersion, flowing in a process line, for example, a pipeline, are often vibronic measuring systems, for example, Coriolis-mass flow-measuring devices, formed by means of a transmitter circuit—most often formed by means of at least one microprocessor—as well as a vibration-type measuring transducer electrically connected with the transmitter circuit and flowed through during operation by the medium to be measured. Vibration-type measuring transducers, and vibronic measuring systems formed therewith, are described, for example, in US-A 2012/0192658, US-A 2017/0261474 and WO-A 2016/107694. The tube arrangement of such a measuring transducer includes a bent first tube, a second tube constructed equally to the first tube, a bent third tube as well as a fourth tube constructed equally only to the third tube. Moreover, the above-mentioned tube arrangement includes a first flow divider—for example, serving during operation as a line branching—with—here exactly—four flow openings and an equally embodied, second flow divider—for example, serving during operation as a line junction—with—here likewise exactly—four flow openings. Each of the above described—here exactly—four tubes extends, in each case, from a first end to a second end with a tube length—corresponding to a straightened length, or a length of its center line—and additionally has, in each case, a lumen surrounded by a tube wall—typically a metal tube wall—in each case, extending from the first end of the tube to the second end of the tube, wherein the tube wall is typically embodied monolithically, such that the tube is typically formed as one piece. Additionally, the four tubes belonging to an above described tube arrangement have equal calibers (inner diameter) and each of the tubes is connected to each of the two flow dividers for the purpose of forming parallel flow paths, in such a manner that the first tube communicates with its first end with a first flow opening of the first flow divider and with its second end with a first flow opening of the second flow divider, the second tube communicates with its first end with a second flow opening of the first flow divider and with its second end with a second flow opening of the second flow divider, the third tube communicates with its first end with a third flow opening of the first flow divider and with its second end with a third flow opening of the second flow divider and the fourth tube communicates with its first end with a fourth flow opening of the first flow divider and with its second end with a fourth flow opening of the second flow divider. The tube wall of each of the tubes is composed typically of the same material, such as e.g. a stainless steel or a nickel based alloy.

Typically, measuring transducers of the type being discussed, as well as also disclosed in US-A 2012/0192658, US-A 2017/0261474 and WO-A 2016/107694, have, in each case, furthermore, a transducer housing jacketing the tubes and having a most often hermetically sealed cavity, within which the tubes are arranged. These transducer housings are formed by means of a cylindrical, especially tubular, or at least sectionally hollow, cylindrical, support element as well as a—, for example, cap shaped—envelope element. The support element extends from a first end to a second end with a support element length and is connected mechanically, especially by material bonding, at its first end with the first flow divider and at its second end with the second flow divider. The envelope element is, in turn, connected mechanically, especially by material bonding, with the support element. Both the support element as well as also the envelope element have, in each case, a hollow space surrounded by a wall, typically a metal wall, and forming a portion of the cavity, in such a manner that a wall of the envelope element together with a segment of the wall of the support element surround a hollow space forming a portion of the cavity and the hollow spaces communicate and merge with one another. For such purpose, there are provided in the wall of the support element, in each case, a first opening as well as at least a second opening spaced from the first opening along an imaginary surface element of the wall in such a manner that each of the first and second openings, in each case, forms a portion of the cavity of the transducer housing and each of the tubes extends, in each case, both through the first opening as well as also through the second opening.

The tube arrangement, and the measuring transducer formed therewith, are provided, and adapted, to be inserted into the course of a process line in the form of a pipeline conveying a fluid to be measured—for example, a gas, a liquid or a dispersion. During operation, the fluid flows through the measuring transducer. Moreover, each of the above described tubes is, in each case, adapted to lead in its lumen the, in given cases, flowing fluid and during that, not least of all for the purpose of effecting measurement effects correlated with the at least one measured variable, to be caused to vibrate, especially in such a manner that each of the tubes executes wanted oscillations, namely mechanical oscillations about a rest position with a wanted frequency co-determined by the density of the medium and, consequently, usable as a measure for density. In the case of measuring systems formed as Coriolis-mass flow-measuring devices, typically bending oscillations at a natural resonant frequency serve as wanted oscillations, for example, bending oscillations, which correspond to a natural bending oscillation, fundamental mode inherent to the measuring transducer, a mode, in which the oscillations of each of the measuring tubes are, in each case, resonant oscillations, which have exactly one oscillatory antinode. The wanted oscillations are in the case of an at least sectionally bent tube, additionally, typically so embodied that the tube moves in a pendulum-like manner about an associated, imaginary oscillation axis imaginarily connecting an inlet end and an outlet end of the tube, in the manner of a cantilever held on one end. The measuring transducer can then, additionally, for example, be incorporated into the process line such that the first flow divider of the tube arrangement is arranged on the inlet side and, consequently, serves as a line branching, and the second flow divider of the tube arrangement is arranged on the outlet side and, consequently, serves as a line junction and each of the tubes of the tube arrangement is flowed through by fluid in a shared flow direction, namely from their first ends toward their second ends.

In the case of the measuring transducer shown in WO-A 2016/107694, the two tubes belonging to one pair of equally constructed tubes have, especially, in each case, a different tube length than the other two tubes belonging to the, in each case, other pair of equally constructed tubes, in such a manner that the first and second tubes, in each case, have a greater tube length than the third and fourth tubes. In this way, the tube arrangement is, on the one hand, formed by means of tubes, which only pairwise have equal eigen-, or resonance frequencies, consequently there are, even in a tube arrangement having no additional node plates coupling the pairwise equally embodied tubes, two mechanical oscillators with frequency spectra having eigen-, or resonance frequencies significantly differing from one another, namely deviating from one another at least in a bending oscillation fundamental mode. On the other hand, such a tube arrangement provides parallel flow paths with mutually differing flow resistances in such a manner that that one of the two previously indicated oscillators, which, in the particular bending oscillation fundamental mode, has the comparatively higher eigenfrequency, resists the flowing fluid with the comparatively lower flow resistance.

For exciting and maintaining the driven mechanical oscillations of the tube arrangement, especially the above described, wanted oscillations, the measuring transducer includes a corresponding exciter mechanism formed by means of two equally embodied electrodynamic oscillation exciters. Each of the oscillation exciters, in each case, electrically connected by means of a pair of electrical connection lines, for example, in the form of connection wires and/or in the form of conductive traces of a flexible printed circuit board, to the above described transmitter circuit, serves, especially, to convert an electrical excitation power supplied by an electrical driver signal generated and appropriately conditioned, namely, in each case, adapted at least for changing oscillation characteristics of the tubes, and provided by a drive electronics in the transmitter circuit into driving forces acting on the tubes adjoining it. The drive electronics is, especially, also adapted so to set each of the driver signals by means of an internal control system such that each has a signal frequency corresponding to the wanted frequency to be excited, which can also change as a function of time.

Due to the above described, wanted oscillations—not least of all also for the case, in which the wanted oscillations are bending oscillations—as is known, Coriolis forces are induced in the flowing medium, forces dependent on the instantaneous mass flow rate. These can, in turn, bring about Coriolis oscillations with the wanted frequency, oscillations which are dependent on the mass flow rate and superimpose, in each case, on the wanted oscillations, in such a manner that between inlet side and outlet side, oscillatory movements of each of the tubes executing the wanted oscillations and simultaneously flowed through by fluid, a travel time-, or phase difference, can be determined, which is dependent on the mass flow rate, and consequently also usable as a measure for the mass flow measurement. In the case of an at least sectionally bent tube, in the case of which selected for the wanted oscillations is an oscillation form, in which the tube is caused to move like a pendulum in the manner of a cantilever held on one end, the resulting Coriolis oscillations correspond, for example, to a bending oscillation mode—, at times, also referred to as a twist mode—, in which the tube, in each case, executes rotary oscillations about an associated imaginary rotary oscillation axis directed perpendicularly to the mentioned imaginary oscillation axis.

Furthermore, the measuring transducer includes a sensor arrangement serving for registering mechanical oscillations of the tube arrangement, especially the above described bending oscillations of the tubes, as well as for producing measuring signals representing oscillatory movements of one or more of the tubes and formed by means of four, equally constructed, electro-dynamic oscillation sensors. For the purpose of preventing measurement damaging contacts of the vibrating tubes among one another or with the transducer housing, each of the tubes is sufficiently spaced from the other tubes, as well as also from the transducer housing, not least of all also from an edge of each of the two openings provided in the wall of the support element, such that each tube can under all operating conditions execute free oscillations with oscillation amplitude sufficient for measurement.

Each of the tubes of the above described tube arrangement, and of the measuring transducer formed therewith, has, in each case, at least one straight first segment connected with the first flow divider of the tube arrangement and consequently forming the first end of the tube, a arc shaped second segment following the first segment, a straight third segment following the second segment, an arc shaped fourth segment following the third segment, a straight fifth segment following the fourth segment, an arc shaped sixth segment following the fifth segment as well as a straight seventh segment both following the sixth segment as well as also connected with the second flow divider of the tube arrangement, and, consequently, forming the second end of the tube, wherein both each of the first and seventh segments as well as also each of the second and sixth segments, as well as also the third and fifth segments of a tube form, typically, in each case, pairs of equally constructed segments. The arc shaped segments can, additionally, be embodied, for example, with circular arc shape and the straight segments can be, for example, hollow cylindrical. The first and seventh segments can be connected with their flow dividers by material bonding, for example, by soldering or welding, or by compression and/or roll expansion force- and/or shape interlocking.

The tubes of the tube arrangement are, in each case, so formed, for example, by bending, that each of the first, second, third and fourth tubes, as a result, has, in each case, a tube form lying in a single (bending-)plane. Additionally, each of the tubes has, in each case, a first imaginary symmetry plane as well as a second imaginary symmetry plane perpendicular thereto and each of the tubes is so formed that it is, in each case, both mirror symmetrical to its first symmetry plane as well as also to its second symmetry plane, for example, in such a manner that, as a result, each of the above described tubes is embodied at least partially essentially V-shaped such that at least portions of each has an essentially V-shape. Moreover, the tubes and flow dividers are, such as quite usual in the case of tube arrangements of the aforementioned type, so embodied and arranged that the particular tube arrangement has, as a result, located both between the first and second tubes as well as also between the third and fourth tubes, a first imaginary symmetry plane, relative to which the tube arrangement is mirror symmetric, and the tube arrangement has a second imaginary symmetry plane perpendicular to the first imaginary symmetry plane, equally as well, imaginarily intersecting each of the tubes—here namely their fourth segment—, relative to which the tube arrangement is likewise mirror symmetrical. Additionally, the tubes are so arranged that the first tube has from the first imaginary symmetry plane a smallest separation, which equals a smallest separation, which the third tube has from the first imaginary symmetry plane and the third tube has from the first imaginary symmetry plane a smallest separation, which equals a smallest separation, which the fourth tube has from the first imaginary symmetry plane; this, especially, also in such a manner that the first and second tubes are parallel relative to one another, or to the first imaginary symmetry plane and the third and fourth tubes are parallel relative to one another, or to the first imaginary symmetry plane, for example, also in such a manner that the first tube and the third tube lie in a shared first tube plane and the second tube and the fourth tube lie in a shared second tube plane. Especially, tubes and flow dividers of the above described tube arrangements are, additionally, so embodied and arranged that both an imaginary longitudinal axis of each of the third segments is parallel to each of the longitudinal axes of the other third segments as well as also an imaginary longitudinal axis of each of the fifth segments is parallel to each of the longitudinal axes of the other fifth segments, consequently neither an imaginary longitudinal axis of one of the third segments intersects a longitudinal axis of another of the third segments nor does an imaginary longitudinal axis of one of the fifth segments intersect a longitudinal axis of another of the fifth segments. The tube arrangement and the transducer housing are in the case of the aforementioned measuring transducers additionally, in each case, so embodied and positioned that each of the tubes is only partially arranged within the hollow space of the support element, consequently only partially within the hollow space of the envelope element, and, indeed, in such a manner that both the second segments as well as also each of the sixth segments, in each case, is arranged at least predominantly within the hollow space of the support element and both each of the third segments as well as also each of the fifth segments is arranged at least predominantly within the hollow space of the envelope element, while each of the fourth segments is only within the hollow space of the envelope element, consequently completely outside of the hollow space of the support element.

In the case of vibration-type measuring transducers, the transducer housing serves, among other things, for the protection of the components of the tube-, exciter- and sensor arrangements arranged therein against damaging environmental influences, for preventing undesired sound emissions from the vibrating tubes, as well as also as for containment of escaping fluid in the case of a leaking tube arrangement. Moreover, the transducer housing serves, especially, however, also for absorbing mechanical forces and/or moments introduced into the measuring transducer via the connected process line, in such a manner that of the forces and/or moments, at most, only transferred to the tube arrangement arranged within the transducer housing are such fractions, which are negligible for the desired high accuracy of measurement. These forces and moments are typically absorbed predominantly by the support element of the transducer housing having appropriately high expansion-, bending- and twist resistance. In the case of the above referenced measuring transducers known from the state of the art, the expansion-, bending- and twist resistances lastly provided by the support element are decisively co-determined by how the two openings provided in the wall of the support element are embodied; this, especially, in such a manner that in the case of a predetermined dimensioning of the outer contour of the support element, for nevertheless sufficient expansion-, bending- and twist resistances, the thickness of its wall must be dimensioned greater, the greater the cross section of each of the two openings, and that the expansion-, bending- and twist resistances provided by the support element are greater, the smaller the two openings are embodied. Conversely, the two openings must, such as already mentioned, be large enough, in order not to degrade the mechanical oscillations of the tubes. In order to be able to build the measuring transducer as compactly as possible, or as easily as possible, the tubes of its tube arrangement must have minimum, or as small as possible, separations both relative to one another as well as also relative to the edges of the above described openings in the wall of the support element.

Investigations on measuring systems of type being discussed have shown that the accuracy of measurement, with which the mass flow rate can be ascertained, and, conversely, measurement failures of the measuring system, can be highly dependent on such influencing variables, not least of all a temperature, a pressure and a density of the through flowing fluid, or their time rate of change, which can, on the one hand, be barely, or only with very large technical effort, registered during operation by the measuring system and whose influence on the accuracy of measurement, on the other hand, can be scarcely, or only in insufficient measure, compensated; this, especially, also in such a manner that a (scale) zero-point of the calibration curve of the measuring system is insufficiently stable during operation, or a trust range (confidence interval) for the mass flow-measured values ascertained by means of the measuring system is too large. Further investigations have shown that the above referenced measuring errors also so far not compensable by additional measurements can be attributed to, among other things, such influences, or disturbances, of the oscillations of the tubes, which are coupled into the tubes via the surrounding atmosphere, for example, an air volume present in the above described cavity of the transducer housing; this, especially, also in such a manner that each of the vibrating tubes moves the surrounding atmosphere correspondingly back and forth and the so moved atmosphere, in turn, effects additional, equally as well changeable as a function of time, dampings of the oscillations, especially also the Coriolis oscillations, of each of the tubes. These disturbances of the oscillations, or the measuring errors caused thereby can be greater, the smaller the separation between the tubes. Additionally, the disturbances, or their effect on the accuracy of measurement, can also depend on the temperature, the pressure and/or the density of the fluid to be measured, for example, in that the separations vary with time due to changes of the temperature and/or of the pressure or in that the extent of the movement of the atmosphere varies with the wanted frequency as a function of time.

SUMMARY

Starting from the above described state of the art, an object of the invention is to so improve measuring transducers of the type being discussed that the above-mentioned mutual influencing of the oscillations of the tubes is lessened, or prevented; this especially also in the case of as compact as possible and as easy as possible construction of the measuring transducer.

For achieving the object, the invention resides in a measuring transducer for a vibronic measuring system serving for measuring at least one measured variable of a flowing fluid, which measuring transducer comprises:

- a tube arrangement having a bent (for example, at least sectionally V-shaped- and/or one piece) first tube, a bent second tube embodied equally to the first tube, a bent (for example, at least sectionally V-shaped- and/or one piece) third tube, a fourth tube embodied equally only to the third tube, a first flow divider (for example, serving as a line branching and/or located inlet side) with (for example, also exactly) four flow openings, and a second flow divider (for example, embodied equally to the first flow divider and/or serving as a line junction and/or located outlet side) with (for example, exactly) four flow openings;
- an exciter mechanism for exciting and maintaining mechanical oscillations of the tube arrangement (for example, bending oscillations of each of the first, second, third and fourth tubes about rest positions); as well as
- a sensor arrangement for registering mechanical oscillations of the tube arrangement (for example, bending oscillations of each of the first, second, third and fourth tubes about rest positions) and for producing measuring signals representing oscillatory movements of one or more of the first, second, third and fourth tubes. In the case of the measuring transducer of the invention, each of the first, second, third and fourth tubes extends, in each case, with a tube length from a first end of the tube to a second end of the tube and has, in each case, a lumen surrounded by a (for example, metal) tube wall and extending from the first end of the tube to the second end of the tube and each of the first, second, third and fourth tubes is connected, in each case, to each of the first and second flow dividers in such a manner that
  - the first tube communicates with its first end with a first flow opening of the first flow divider and with its second end with a first flow opening of the second flow divider,
  - the second tube communicates with its first end with a second flow opening of the first flow divider and with its second end with a second flow opening of the second flow divider,
  - the third tube communicates with its first end with a third flow opening of the first flow distributor and with its second end with a third flow opening of the second flow divider, and
  - the fourth tube communicates with its first end with a fourth flow opening of the first flow divider and with its second end with a fourth flow opening of the second flow divider. Additionally, each of the first, second, third and fourth tubes has, in each case, at least
    - a straight (for example, also hollow cylindrical) first segment connected (for example, by material-bonding and/or by force- and/or shape interlocking) with the first flow divider,
    - an arc shaped (for example, also circular arc shaped) second segment following the first segment,
    - a straight (for example, also hollow cylindrical) third segment following the second segment,
    - an arc shaped (for example, also circular arc shaped) fourth segment following the third segment,
  - a straight (for example, also constructed equally to the third segment and/or hollow cylindrical) fifth segment following the fourth segment
  - an arc shaped (for example, also constructed equally to the second segment and/or circular arc shaped) sixth segment following the fifth segment as well as
  - a straight (for example, also constructed equally to the first segment and/or hollow cylindrical) seventh segment both following the sixth segment as well as also connected (for example, material-bonded and/or by force- and/or shape interlocking) with the second flow divider. Furthermore, in the case of the measuring transducer of the invention, a smallest separation between the fourth segment of the first tube and the fourth segment of the third tube is both greater than a smallest separation between the third segment of the first tube and the second segment of the third tube as well as also greater than a smallest separation between the fifth segment of the first tube and the sixth segment of the third tube and a smallest separation between the fourth segment of the second tube and the fourth segment of the fourth tube is both greater than a smallest separation between the third segment of the second tube and the second segment of the fourth tube as well as also greater than a smallest separation between the fifth segment of the second tube and the sixth segment of the fourth tube and, additionally, an imaginary longitudinal axis of the third segment of the first tube as well as an imaginary longitudinal axis of the third segment of the third tube enclose (for example, in a projection onto a first imaginary symmetry plane of the tube arrangement), upon extension, a first angle of intersection, an imaginary longitudinal axis of the third segment of the second tube as well as an imaginary longitudinal axis of the third segment of the fourth tube enclose (for example, in a projection onto a first imaginary symmetry plane of the tube arrangement), upon extension, a second angle of intersection, an imaginary longitudinal axis of the fifth segment of the first tube as well as an imaginary longitudinal axis of the fifth segment of the third tube enclose (for example, in a projection onto a first imaginary symmetry plane of the tube arrangement), upon extension, a third angle of intersection, and an imaginary longitudinal axis of the fifth segment of the second tube and an imaginary longitudinal axis of the fifth segment of the fourth tube enclose (for example, in a projection onto a first imaginary symmetry plane of the tube arrangement), upon extension, a fourth angle of intersection.

Moreover, the invention resides also in a vibronic measuring system for measuring and/or monitoring at least one flow parameter, for example, also a flow parameter changeable as a function of time, for example, a mass flow rate, a volume flow rate and/or a flow velocity, and/or for measuring and/or monitoring at least one substance parameter, for example, a substance parameter changeable as a function of time, for example, a density and/or a viscosity, of a flowing fluid, especially a gas, a liquid or a dispersion, which measuring system comprises: the measuring transducer of the invention as well as a measuring- and operating electronics (for example, a measuring- and operating electronics formed by means of at least one microprocessor and/or by means of at least one digital signal processor) electrically coupled (for example, by means of electrical connection lines) both with the exciter mechanism as well as also with the sensor arrangement.

Additionally, the invention resides also in the use of the aforementioned measuring transducer or the aforementioned vibronic measuring system formed therewith for measuring and/or monitoring a fluid flowing (for example, a liquid flowing with a mass flow rate of greater than 1500 t/h) in a pipeline (for example, a pipeline having a nominal diameter of greater than 100 mm).

In a first embodiment of the invention, it is, furthermore, provided that each of the first, second, third and fourth tubes, in each case, is adapted to lead fluid in its lumen, for example, to be flowed through starting from its first end and flowing in the direction toward its second end, and during that to be caused to vibrate.

In a second embodiment of the invention, it is, furthermore, provided that each of the first, second, third and fourth angles of intersection is, in each case, greater than 0.1 and less than 10°.

In a third embodiment of the invention, it is, furthermore, provided that at least the first angle of intersection and the second angle of intersection are equally large.

In a fourth embodiment of the invention, it is, furthermore, provided that at least the third angle of intersection and the fourth angle of intersection are equally large.

In a fifth embodiment of the invention, it is, furthermore, provided that the smallest separation between the third segment of the first tube and the second segment of the third tube and the smallest separation between the fifth segment of the first tube and the sixth segment of the third tube are equally large.

In a sixth embodiment of the invention, it is, furthermore, provided that the smallest separation between the third segment of the second tube and the second segment of the fourth tube and the smallest separation between the fifth segment of the second tube and the sixth segment of the fourth tube are equally large.

In a seventh embodiment of the invention, it is, furthermore, provided that the smallest separation between the fourth segment of the first tube and the fourth segment of the third tube amounts to less than 10 times the smallest distance between the third segment of the first tube and the second segment of the third tube.

In an eighth embodiment of the invention, it is, furthermore, provided that the smallest separation between the fourth segment of the first tube and the fourth segment of the third tube amounts to less than 10 times the smallest distance between the fifth segment of the first tube and the sixth segment of the third tube.

In a ninth embodiment of the invention, it is, furthermore, provided that the smallest separation between the fourth segment of the first tube and the fourth segment of the third tube amounts to less than sum of a caliber of the first tube and a caliber of the third tube.

In a tenth embodiment of the invention, it is, furthermore, provided that the smallest separation between the fourth segment of the second tube and the fourth segment of the fourth tube amounts to less than sum of a caliber of the second tube and a caliber of the fourth tube.

In an eleventh embodiment of the invention, it is, furthermore, provided that each of the first, second, third and fourth tubes has, in each case, a first imaginary symmetry plane as well as a second imaginary symmetry plane perpendicular thereto, and wherein each of the first, second, third and fourth tubes is, in each case, mirror symmetric both to its first symmetry plane as well as also to its second symmetry plane.

In a twelfth embodiment of the invention, it is, furthermore, provided that the tube arrangement has a first imaginary symmetry plane located both between the first and second tubes as well as also between the third and fourth tubes, and the tube arrangement is mirror symmetric at least relative to the first imaginary symmetry plane. Developing this embodiment of the invention, it is, furthermore, provided that the first tube has from the first imaginary symmetry plane of the tube arrangement a smallest separation, which equals a smallest separation, which the third tube has from the first imaginary symmetry plane of the tube arrangement and/or that the second tube has from the first imaginary symmetry plane of the tube arrangement a smallest separation, which equals a smallest separation, which the fourth tube has from the first imaginary symmetry plane of the tube arrangement and/or that each of the first, second, third and fourth tubes is parallel to the first imaginary symmetry plane of the tube arrangement and/or that the tube arrangement has a second imaginary symmetry plane perpendicular to the first imaginary symmetry plane of the tube arrangement, equally as well imaginarily intersecting each of the first, second, third and fourth tubes (for example, their fourth segment) and is mirror symmetric relative to the second imaginary symmetry plane of the tube arrangement. Developing this embodiment of the invention, it is, furthermore, provided that the tube arrangement has a first imaginary connecting axis, which connects a center of the first flow opening of the first flow divider and a center of the first flow opening of the second flow divider imaginarily with one another, a second imaginary connecting axis, which connects a center of the second flow opening of the first flow divider and a center of the second flow opening of the second flow divider imaginarily with one another, a third imaginary connecting axis, which connects a center of the third flow opening of the first flow divider and a center of the third flow opening of the second flow divider imaginarily with one another as well as a fourth imaginary connecting axis, which connects a center of the fourth flow opening of the first flow divider and a center of the fourth flow opening of the second flow divider imaginarily with one another, for example, in such a manner that each of the imaginary connecting axes, in each case, extends in parallel with each of the other connecting axes, and additionally, each of the tubes has, in each case, a tube arc height, measured within the above described symmetry plane as a smallest distance between its fourth segment to its imaginary connecting axis, namely its imaginary connecting axis imaginarily connecting its first and second ends, which tube arc height is so selected that each of the tubes, in each case, has a tube length to tube arc height-ratio, measured as a quotient of the tube length of the tube to the tube arc height, which is greater than 2 (2:1), for example, greater than 2.5 (2.5:1), and less than 4 (4:1), for example, less than 3 (3:1), and/or that each of the tubes has, in each case, a caliber to-tube arc height-ratio, measured as a quotient of the caliber of the tube to the tube arc height, which is greater than 0.1, for example, also less than 0.2.

In a thirteenth embodiment of the invention, it is, furthermore, provided that the tube wall of each of the first, second, third and fourth tubes is composed of equal material, especially, in each case, a stainless steel or a nickel based alloy.

In a fourteenth embodiment of the invention, it is, furthermore, provided that each of the first, second, third and fourth tubes is connected both with the first flow divider as well as also with the second flow divider, in each case, by material bonding.

In a fifteenth embodiment of the invention, it is, furthermore, provided that the tube arrangement has exactly four tubes, consequently, except for the first, second, third and fourth tubes, no further tubes connected to the first flow divider and the second flow divider.

In a sixteenth embodiment of the invention, it is, furthermore, provided that each of the first, second, third and fourth tubes has a caliber, which amounts to not less than 20 mm (for example, greater than 40 mm) and/or is equal to the caliber of each of the others of the first, second, third and fourth tubes.

In a seventeenth embodiment of the invention, it is, furthermore, provided that each of the tubes has, in each case, a tube length to caliber-ratio, measured as a quotient of the tube length to the caliber, which is greater than 25 (25:1), for example, however, also less than 30 (30:1).

In an eighteenth embodiment of the invention, it is, furthermore, provided that both the tube length of the first tube as well as also the tube length of the second tube is, in each case, greater than the tube length of the third tube and, in each case, greater than the tube length of the fourth tube.

In a nineteenth embodiment of the invention, it is, furthermore, provided that both a smallest thickness of the tube wall of the first tube as well as also a smallest thickness of the tube wall of the second tube equals, in each case, a smallest thickness of the tube wall of the third tube as well as, in each case, a smallest thickness of the tube wall of the fourth tube.

In a twentieth embodiment of the invention, it is, furthermore, provided that the sensor arrangement has a (for example, electrodynamic) first oscillation sensor, a (for example, electrodynamic and/or embodied equally to the first oscillation sensor) second oscillation sensor, a (for example, electrodynamic and/or embodied equally to the first oscillation sensor) third oscillation sensor as well as at least a (for example, electrodynamic and/or embodied equally to the third oscillation sensor) fourth oscillation sensor. Developing this embodiment of the invention, it is, furthermore, provided that the first oscillation sensor is spaced both from the second segment of the first tube as well as also from the fourth segment of the first tube and mounted on the third segment of the first tube as well as spaced both from the second segment of the second tube as well as also from the fourth segment of the second tube and mounted on the third segment of the second tube; that the second oscillation sensor is spaced both from the sixth segment of the first tube as well as also from the fourth segment of the first tube and mounted on the fifth segment of the first tube as well as spaced both from the sixth segment of the second tube as well as also from the fourth segment of the second tube and mounted on the fifth segment of the second tube; that the third oscillation sensor is both spaced from the second segment of the third tube as well as also from the fourth segment of the third tube and mounted on the third segment of the third tube as well as spaced both from the second segment of the fourth tube as well as also from the fourth segment of the fourth tube and mounted on the third segment of the fourth tube; and the fourth oscillation sensor is spaced both from the sixth segment of the third tube as well as also from the fourth segment of the third tube and mounted on the fifth segment of the third tube as well as spaced both from the sixth segment of the fourth tube as well as also from the fourth segment of the fourth tube and mounted on the fifth segment of the fourth tube. The first oscillation sensor can be positioned e.g. both in part between the third segment of the first tube and the third segment of the third tube as well as also in part between the third segment of the second tube and the third segment of the fourth tube and the second oscillation sensor can be positioned e.g. both in part between the fifth segment of the first tube and the fifth segment of the third tube as well as also in part between the fifth segment of the second tube and the fifth segment of the fourth tube and/or e.g. the third oscillation sensor can be positioned both in part between the third segment of the first tube and the third segment of the third tube as well as also in part between the third segment of the second tube and the third segment of the fourth tube and e.g. the fourth oscillation sensor can be positioned both in part between the fifth segment of the first tube and the fifth segment of the third tube as well as also in part between the fifth segment of the second tube and the fifth segment of the fourth tube. Alternatively or supplementally, the first oscillation sensor and the second oscillation sensor can be spaced, in each case, both equally far from the fourth segment of the first tube as well as also equally far from the fourth segment of the second tube and/or the third oscillation sensor and the fourth oscillation sensor can be spaced, in each case, both equally far from the fourth segment of the third tube as well as also equally far from the fourth segment of the fourth tube.

In a twenty-first embodiment of the invention, it is, furthermore, provided that the exciter mechanism has an, especially electrodynamic, first oscillation exciter as well as at least a second oscillation exciter, especially an electrodynamic second oscillation exciter and/or a second oscillation exciter embodied equally to the first oscillation exciter. Developing this embodiment of the invention, it is, furthermore, provided that the first oscillation exciter is spaced both from the third segment of the first tube as well as also from the fifth segment of the first tube and mounted on the fourth segment of the first tube as well as spaced both from the third segment of the second tube as well as also from the fifth segment of the second tube and mounted on the fourth segment of the second tube, and the second oscillation exciter is spaced both from the third segment of the third tube as well as also from the fifth segment of the third tube and mounted on the fourth segment of the third tube as well as spaced both from the third segment of the fourth tube as well as also from the fifth segment of the fourth tube and mounted on the fourth segment of the fourth tube. For example, the first oscillation exciter can be positioned both in part between the fourth segment of the first tube and the fourth segment of the third tube as well as also in part between the fourth segment of the second tube and the fourth segment of the fourth tube and/or the second oscillation exciter can be positioned both in part between the fourth segment of the first tube and the fourth segment of the third tube as well as also in part between the fourth segment of the second tube and the fourth segment of the fourth tube and/or the first oscillation exciter can be spaced both from the third segment of the first tube and from the fifth segment of the first tube as well as also from the third segment of the second tube and from the fifth segment of the second tube, in each case, equally far and/or the second oscillation exciter can be spaced both from the third segment of the third tube and from the fifth segment of the third tube as well as also from the third segment of the fourth tube and from the fifth segment of the fourth tube, in each case, equally far.

In a twenty-second embodiment of the invention, it is, furthermore, provided that the first flow divider has a first connecting flange (for example, a first connecting flange serving for connecting the tube arrangement to a line segment of a process line supplying the fluid) and the second flow divider has a second connecting flange (for example, a second connecting flange serving for connecting the tube arrangement to a line segment of a process line removing the fluid). Developing this embodiment of the invention, it is, furthermore, provided that each of the connecting flanges has, in each case, a sealing surface for fluid tight, leakage free connecting of the tube arrangement with a line segment of a process line. Each sealing surface of each of the first and second connecting flanges can, in each case, have a smallest diameter (for example, amounting to greater than 100 mm and/or defining a nominal diameter of the measuring transducer), or a smallest separation between the sealing surfaces of the first and second connecting flanges can define an installed length (for example, amounting to greater than 1000 mm and/or less than 3000 mm) of the tube arrangement, or of the measuring transducer formed therewith.

In a further development of the invention, the measuring transducer further comprises a transducer housing jacketing the first, second, third and fourth tubes, and it is, additionally, provided that the transducer housing has at least one (for example, also hermetically sealed) cavity and each of the first, second, third and fourth tubes is arranged within the cavity.

In a first embodiment of the further development of the invention, it is, furthermore, provided that the transducer housing has a pressure resistance greater than 50 bar.

In a second embodiment of the further development of the invention, it is, furthermore, provided that the transducer housing has a pressure resistance, which is greater than a greatest pressure resistance of the first, second, third and fourth tubes.

In a third embodiment of the further development of the invention, it is, furthermore, provided that each of the first, second, third and fourth tubes has, in each case, a smallest separation from the transducer housing, which smallest separation is greater than 5 mm and/or less than 10 mm.

In a fourth embodiment of the further development of the invention, it is, furthermore, provided that the transducer housing has a (for example, cylindrical and/or tubular and/or at least sectionally hollow cylindrical) support element extending from a first end to a second end with a support element length, wherein the support element is connected mechanically (for example, by material bonding) at its first end with the first flow divider and at its second end with the second flow divider.

In a fifth embodiment of the further development of the invention, it is, furthermore, provided that the transducer housing has a (for example, cylindrical and/or tubular and/or at least sectionally hollow cylindrical) support element extending from a first end to a second end with a support element length, wherein the support element is connected mechanically (for example, by material bonding) at its first end with the first flow divider and at its second end with the second flow divider and wherein the support element has at least one hollow space forming a portion of the cavity and surrounded by a wall, especially a metal wall. The wall of the support element can be, for example, a steel, namely a stainless steel or a structural steel, and/or can be composed of the same material as the tube wall of each of the first, second, third and fourth tubes.

In a sixth embodiment of the further development of the invention, it is, furthermore, provided that the transducer housing has a (for example, cylindrical and/or tubular and/or at least sectionally hollow cylindrical) support element extending from a first end to a second end with a support element length, wherein the support element is connected mechanically (for example, by material bonding) at its first end with the first flow divider and at its second end with the second flow divider and wherein the support element has at least one hollow space surrounded by a wall, especially a metal wall, and forming a portion of the cavity, wherein each of the first, second, third and fourth tubes is arranged only in part within the hollow space of the support element; this, for example, also in such a manner that each of the second segments of each of the first, second, third and fourth tubes is arranged at least predominantly within the hollow space of the support element and/or and each of the sixth segments of each of the first, second, third and fourth tubes is arranged at least predominantly within the hollow space of the support element and/or that each of the third and fifth segments of each of the first, second, third and fourth tubes is arranged at least predominantly outside of the hollow space of the support element.

In a seventh embodiment of the further development of the invention, it is provided that the transducer housing has a (for example, cylindrical and/or tubular and/or at least sectionally hollow cylindrical) support element extending from a first end to a second end with a support element length, wherein the support element is connected mechanically (for example, by material bonding) at its first end with the first flow divider and at its second end with the second flow divider and wherein the support element has at least one hollow space surrounded by a wall, especially a metal wall, and forming a portion of the cavity, wherein each of the first, second, third and fourth tubes is arranged only in part within the hollow space of the support element, and it is, furthermore, provided that the wall of the support element has a first opening as well as at least a second opening spaced from the first opening along an imaginary surface element of the wall, wherein each of the first and second openings forms, in each case, a portion of the cavity of the transducer housing and wherein each of the first, second, third and fourth tubes extends, in each case, both from the first opening as well as also from the second opening; this, for example, also in such a manner that both within the first opening as well as also within the second opening a smallest separation between the first tube and the third tube is, in each case, less than the smallest separation between the fourth segment of the first tube and the fourth segment of the third tube and/or that both within the first opening as well as also within the second opening a smallest separation between the second tube and the fourth tube is, in each case, less than the smallest separation between the fourth segment of the second tube and the fourth segment of the fourth tube and/or that each of the first, second, third and fourth tubes has, in each case, a smallest separation from an edge of the first opening, and each of the smallest separations from an edge of the first opening is greater than 5 mm and/or less than 10 mm and/or that each of the first, second, third and fourth tubes has, in each case, a smallest separation from an edge of the second opening, and each of the smallest separations from the edge of the second opening is greater than 5 mm and/or less than 10 mm.

In an eighth embodiment of the further development of the invention, it is, furthermore, provided that the transducer housing has a (for example, cylindrical and/or tubular and/or at least sectionally hollow cylindrical) support element extending from a first end to a second end with a support element length (for example, one of the above described support elements) as well as a (for example, cap shaped or tubular) envelope element, wherein the support element is connected mechanically (for example, by material bonding) at its first end with the first flow divider and at its second end with the second flow divider and wherein the envelope element is connected mechanically (for example, by material bonding) with the support element.

In a ninth embodiment of the further development of the invention, it is provided that the transducer housing has a (for example, cylindrical and/or tubular and/or at least sectionally hollow cylindrical) support element extending from a first end to a second end with a support element length (for example, also one of the above described support elements), as well as a (for example, cap shaped or tubular) envelope element, wherein the support element is connected mechanically (for example, by material bonding) at its first end with the first flow divider and at its second end with the second flow divider and wherein the envelope element is connected mechanically (for example, by material bonding) with the support element, and it is, furthermore, provided that the envelope element has a hollow space surrounded by a (for example, metal) wall and forming a portion of the cavity and each of the first, second, third and fourth tubes is arranged only in part within the hollow space of the envelope element; this, for example, also in such a manner that each of the fourth segments of each of the first, second, third and fourth tubes is arranged exclusively within the hollow space of the envelope element and/or and each of the third and fifth segments of each of the first, second, third and fourth tubes is arranged at least predominantly within the hollow space of the envelope element and/or that each of the second and sixth segments of each of the first, second, third and fourth tubes is arranged at least predominantly outside of the hollow space of the envelope element.

In a tenth embodiment of the further development of the invention, it is provided that the transducer housing has a (for example, cylindrical and/or tubular and/or at least sectionally hollow cylindrical) support element extending from a first end to a second end with a support element length (for example, also one of the above described support elements) as well as a (for example, cap shaped or tubular) envelope element, wherein the support element is connected mechanically (for example, by material bonding) at its first end with the first flow divider and at its second end with the second flow divider and wherein the envelope element is connected mechanically (for example, by material bonding) with the support element, and it is, furthermore, provided that the envelope element has a hollow space surrounded by a (for example, metal) wall and forming a portion of the cavity and each of the first, second, third and fourth tubes is arranged only in part within the hollow space of the envelope element, wherein a wall of the envelope element together with a segment of the wall of the support element envelop a hollow space forming a portion of the cavity and wherein each of the first, second, third and fourth tubes is arranged only in part within the hollow space of the envelope element; this, for example, also in such a manner that each of the fourth segments of each of the first, second, third and fourth tubes is arranged exclusively within the hollow space and/or that each of the third and fifth segments of each of the first, second, third and fourth tubes is arranged at least predominantly within the hollow space and/or that each of the second and sixth segments of each of the first, second, third and fourth tubes is arranged at least predominantly outside of the hollow space.

A basic idea of the invention is to prevent, or in sufficient measure to lessen, a coupling of oscillations from a first pair of tubes to a second pair of tubes degrading the accuracy of measurement of vibronic measuring systems of the type being discussed by extending at least the operationally oscillating straight segments of the tubes of the one pair not in parallel with the likewise operationally oscillating straight segments of the tubes of the other pair. As a result, the separation between the tubes starting from a small magnitude within the opening of the support element actually favoring the coupling and, equally as well, firstly, due to the form of construction, not to be prevented can then very quickly be enlarged to a higher magnitude impeding the coupling, in such a manner that with increasing amplitude of the oscillatory movements of the tubes also the separation becomes greater, so that, consequently, the coupling becomes less.

An advantage of the invention is that the zero-point of the measuring system has a comparatively low dependence on temperature and/or pressure of the fluid to be measured, so that the measuring system has, consequently, an improved stability. Moreover, another advantage of the invention is that, due to the application of only pairwise equally embodied tubes, while nevertheless using four tubes with walls of the same caliber and the same material, a tube arrangement can be very easily provided having, on the one hand, pairwise flow paths with mutually deviating flow resistances and, on the other hand, only pairwise equal eigenfrequencies at the bending oscillation fundamental modes of the tubes.

The invention as well as advantageous embodiments thereof will now be explained in greater detail based on examples of embodiments shown in the figures of the drawing. Equal, or equally acting or equally functioning parts are provided in all figures with equal reference characters; when perspicuity requires or it otherwise appears sensible, reference characters already shown in earlier figures are omitted in following figures. Other advantageous embodiments or further developments, especially also combinations of, firstly, only individually explained aspects of the invention, result, furthermore, from the figures of the drawing and/or from claims per se.

BRIEF DESCRIPTION OF THE DRAWINGS

The figures of the drawing show as follows:

FIGS. 1, 2A, 2B show different, partiality sectioned and/or perspective, side views of a vibronic measuring system;

FIGS. 4, 5A, 5B show different, partiality sectioned and/or perspective, side views of another variant of a vibronic measuring system;

DETAILED DESCRIPTION

Figure 1:
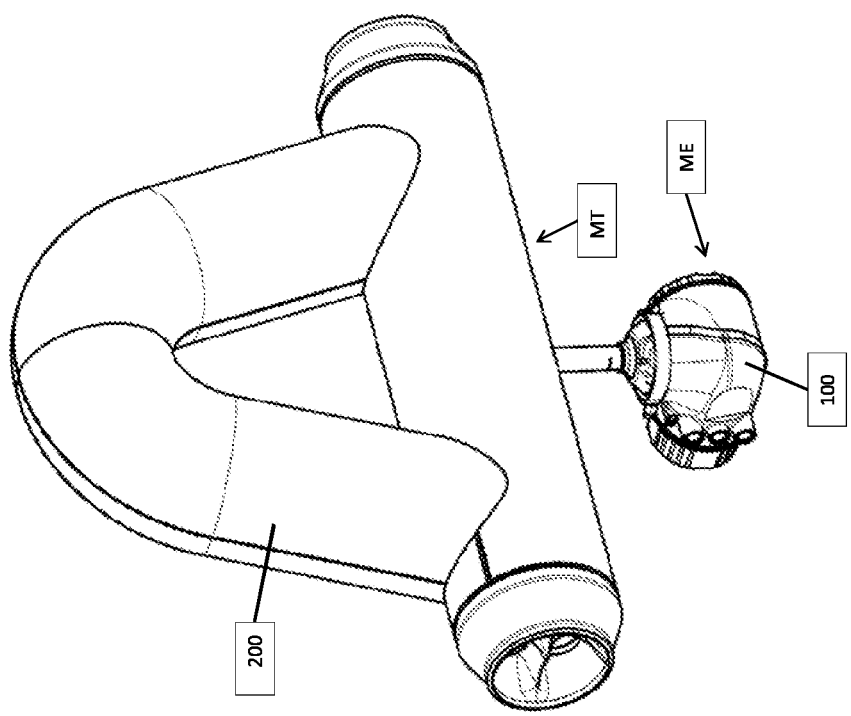

Shown schematically in FIGS. 1, 2A and 2B, and 4, 5A and 5B are examples of embodiments of a vibronic measuring system serving for measuring and/or monitoring at least one flow parameter, especially a flow parameter changeable as a function of time, for example, a mass flow rate, a volume flow rate and/or a flow velocity, and/or for measuring and/or monitoring at least one substance parameter, especially a substance parameter changeable as a function of time, for example, a density and/or a viscosity, of a fluid FL1 flowing at least at times. The measuring system is, especially, provided, and adapted, to be incorporated into the course of a process line conveying the fluid FL1—for example, a gas, a liquid or a dispersion—serving as measured material and/or a process line in the form of a pipeline and during operation to be flowed through by the fluid FL1 supplied and drained via the process line.

As shown in FIGS. 3A, 3B, 6A and 6B, or a combination of FIGS. 1, 2A, 2B, 3A and 3B or 4, 5A, 5B, 6A and 6B, the measuring system comprises a measuring transducer MT having a tube arrangement formed by means of four only pairwise equally embodied tubes (111, 121, 112, 122)—for example, tubes having mutually different flow resistances for the purpose of providing parallel flow paths—, as well as two flow dividers (21, 22) connected thereto, an exciter mechanism (31, 32) for exciting and maintaining mechanical oscillations of the tube arrangement, not least of all of their tubes, as well as a sensor arrangement (41, 42, 43, 44) for registering mechanical oscillations of the tube arrangement, especially of mechanical oscillations of the tubes. Additionally, there can be provided in the measuring transducer, for example, also a temperature measuring arrangement serving for registering temperatures within the tube arrangement and/or a strain measuring arrangement serving for registering mechanical stresses within the tube arrangement.

The tube arrangement of the measuring transducer of the invention, or of the measuring system formed therewith, is shown again in FIGS. 7A, 7B, 8, 9A, 9B, and 10 and includes a bent first tube 111, a bent second tube 121 constructed equally to the tube 111, a bent third tube 112 as well as a fourth tube 122 constructed equally only to the tube 112, consequently neither the tube 111 nor the tube 121. Moreover, the tube arrangement includes a first flow divider 21 with four flow openings 21-1, 21-2, 21-3, 21-4 and a second flow divider 22, for example, a second flow divider 22 embodied equally to the flow divider 21, and having equally four flow openings 22-1, 22-2, 22-3, 22-4. Each of the tubes 111, 112, 121, 122 extends, in each case, from a first end of the tube to a second end of the tube with a tube length and includes, in each case, a lumen surrounded by a—for example, metal-tube wall and extending from the first end of the tube to the second end of the tube. Moreover, each of the tubes 111, 112, 121, 122 is—as well as also directly evident in FIGS. 3A and 3B, and 6A and 6B, in each case, or a combination of FIGS. 2A, 2B, 3A, 3B, 7A, 7B and 8, or 5A, 5B, 6A, 6B, 7A, 7B and 8—, connected to each of the two flow dividers 21, 22, for example, material-bonded-, or connected therewith by force- and/or shape interlocking, in such a manner that the tube 111 communicates with its first end with a first flow opening 21-1 of the flow divider 21 and with its second end with a first flow opening 22-1 of the flow divider 22, the tube 121 communicates with its first end with a second flow opening 21-2 of the flow divider 21 and with its second end with a second flow opening 22-2 of the flow divider 22, the tube 112 communicates with its first end with a third flow opening 21-3 of the flow divider 21 and with its second end with a third flow opening 22-3 of the flow divider 22 and the tube 122 communicates with its first end with a fourth flow opening 21-4 of the flow divider 21 and with its second end with a fourth flow opening 22-4 of the flow divider 22 open. As evident from the combination of FIGS. 2A, 2B, 3A, 3B, 7A, 7B and 8, and 5A, 5B, 6A, 6B, 7A, 7B and 8, the flow divider 21 can be arranged in the flow direction of the fluid FL1 on the inlet side, and serve as a line branching and the flow divider 22 can be arranged correspondingly in the flow direction of the fluid FL1 on the outlet side, and serve as a line junction. In an additional embodiment of the invention, it is, furthermore, provided that the tube arrangement has exactly four tubes, consequently except for the above described tubes 111, 112, 121, 122 no other tubes connected to the flow divider 21 and the flow divider 22. The above-mentioned tube length corresponds here to a straightened length, or to a length of an imaginary center line of the tube, wherein the tube length of the tube 111 equals the tube length of the tube 121, and the tube length of the tube 121 equals the tube length of the tube 122. In an additional embodiment of the invention, it is, additionally, provided that the tube length of the tube 111 only equals the tube length of the tube 121, equally as well, is greater than the tube length both of the tube 121 as well as also of the tube 122, and the tube length of the tube 121 only equals the tube length of the tube 122, equally as well, is less than the tube length of both the tube 111 as well as also the tube 112.

The tube wall of each of the tubes 111, 121, 112, 122 of the tube arrangement has, in each case, a predetermined—for example, also essentially uniform—thickness and can—such as quite usual in the case of tube arrangements of the type being discussed, or measuring transducer, or measuring systems, formed therewith—be, for example, of equal material and/or a metal, especially, in each case, a stainless steel or, in each case, a nickel based alloy. The tubes 111, 121, 112, 122 can, additionally, for example, be embodied, in each case, as one piece, for example, seamlessly or be produced, at least in the case of a tube wall of metal, with a welded seam, and/or, in each case, be formed by bending a tubular, semifinished piece, for example, in such a manner that each of the tubes 111, 121, 112, 122—, as well as also indicated in FIGS. 2A, 2B, 3A and 3B, and 5A, 5B, 6A and 6B, is embodied, in each case, —essentially V-shaped and has a V-shaped outline and/or that each of the tubes, as a result, has a tube form lying in a single (bending-)plane. In an additional embodiment of the invention, each of the tubes has, in each case, a caliber, namely an inner diameter, which amounts to not less than 20 mm, for example, is also greater than 40 mm and/or has the same caliber as each of the other the tubes. Since the pair of tubes 111, 121, and the pair of tubes 121, 122, are of equal construction, the above-mentioned caliber of the tube 111 equals the caliber of the tube 121, and the caliber of the tube 121 equals the caliber of the tube 122. In an additional embodiment of the invention, the caliber of each of the tubes 111, 112, 121, 122 equals the caliber of each of the other tubes 111, 112, 121, and 122 and/or each of the tubes 111, 121, 112, 122 has, furthermore, in each case, a tube length to caliber-ratio, measured as a quotient of the tube length to the caliber, is greater than 25 (25:1), for example, however, also less than 30 (30:1). In an additional embodiment of the invention, the tube wall of each of the tubes has, in each case, a smallest thickness, which amounts to not less than 1 mm, for example, is also greater than 1.5 mm and/or is the same as the smallest thickness of the tube wall of each of the other tubes. Since the pair of tubes 111, 121, and the pair of tubes 121, 122 are of equal construction, the above-mentioned smallest thickness of the tube wall of the tube 111 equals the smallest thickness of the tube wall of the tube 121, and the smallest thickness of the tube wall of the tube 121 equals the smallest thickness of the tube wall of the tube 122. In an additional embodiment of the invention, the above-mentioned tube wall thickness of each of the tubes 111, 112, 121, 122 equals the smallest thickness of the tube wall of each of the other tubes 111, 112, 121, and 122.

For connecting the tube arrangement, or the measuring transducer or measuring system formed therewith with the above referenced process line conveying the fluid FL1, the flow divider 21 can have a first connecting flange—serving, for example, for connecting the tube arrangement to a line segment of the process line during operation supplying the fluid FL1—and the flow divider 22 can have a second connecting flange—serving, for example, for connecting the tube arrangement to a line segment of the process line removing the fluid FL1. Provided on each of the above described connecting flanges can be, for example, in each case, a sealing surface for fluid tight, or leakage free, connecting of the tube arrangement with the corresponding line segment of the process line. Each of the two sealing surfaces can, in each case, have a smallest diameter defining a nominal diameter of the measuring transducer and amounting to greater than 100 mm, and/or have a smallest separation from the other sealing surface—here defining an installed length of the tube arrangement, or of the measuring transducer formed therewith—, which amounts to greater than 1000 mm and/or less than 3000 mm.

Figure 7A:
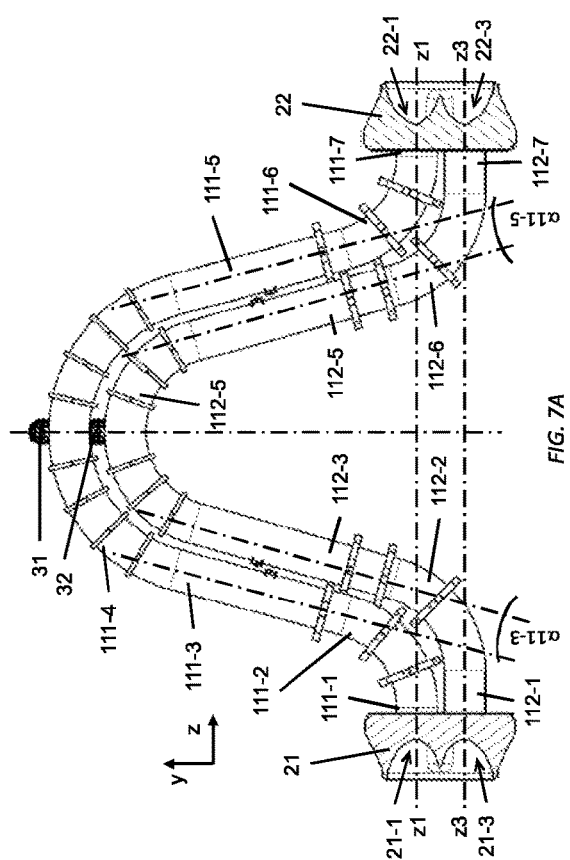
FIGS. 7A, 7B show two side views, a tube arrangement of a measuring transducer of FIGS. 3A, 3B, or FIGS. 6A, 6B.
Figure 7B:
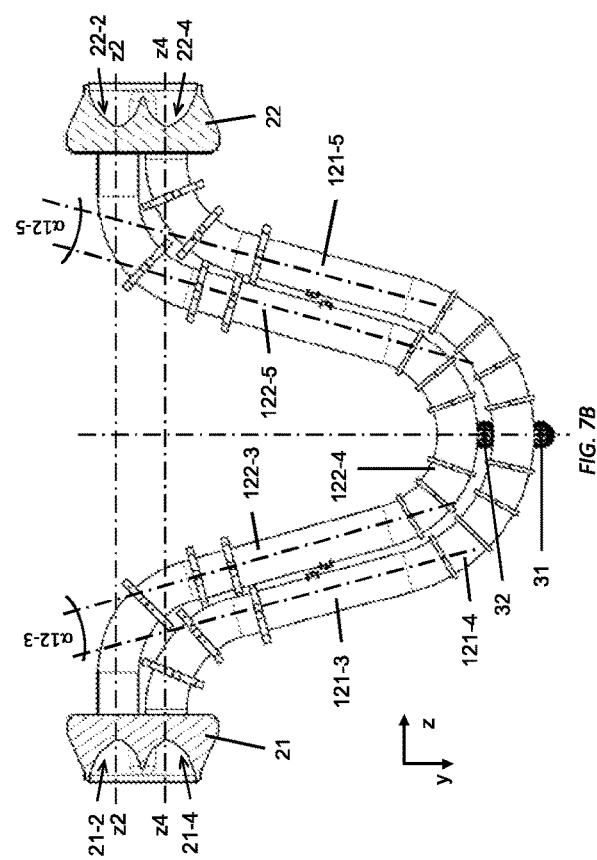
Figure 8:
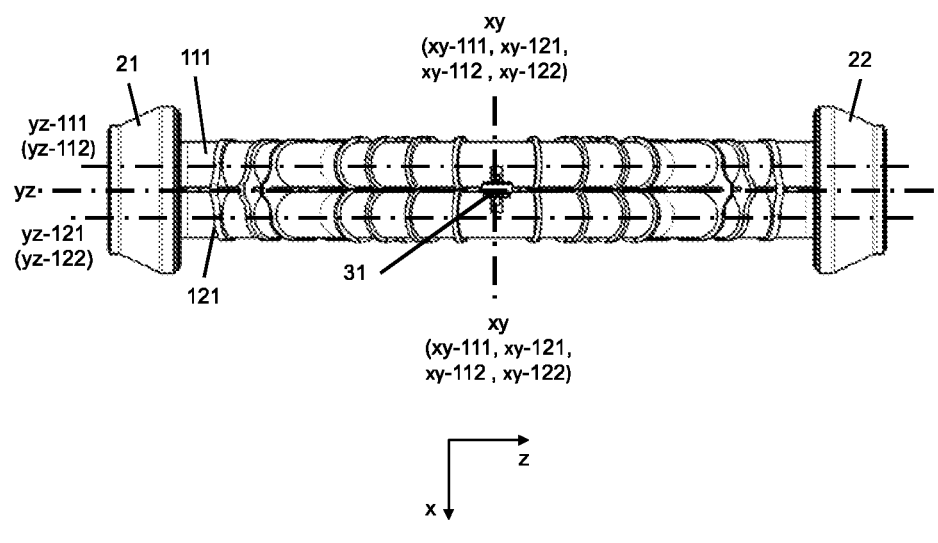
FIGS. 8, 9A, 9B show three additional side views, the tube arrangement of a measuring transducer of FIGS. 7A and 7B.
Figure 9A:
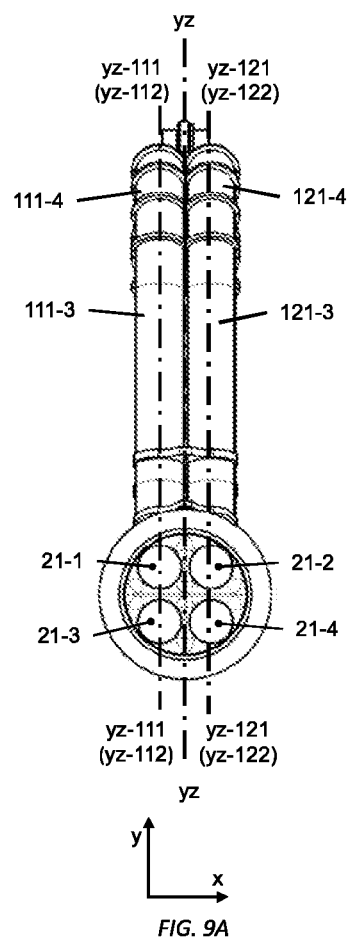
Figure 9B:
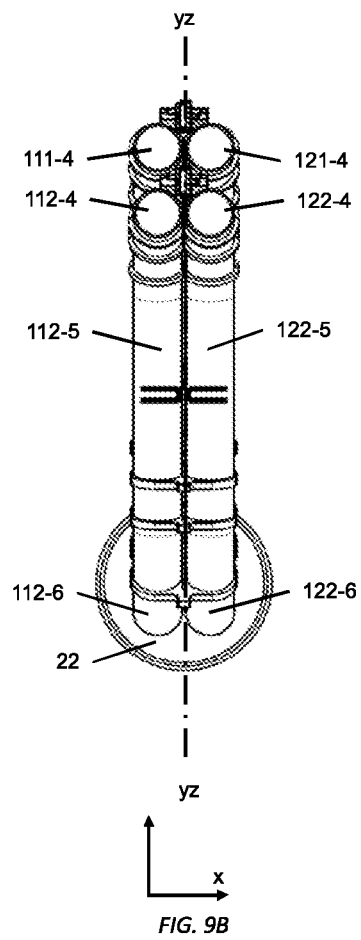

The tubes 111, 121, 112, 122 and the flow dividers 21, 22 are, according to an additional embodiment of the invention, furthermore, so embodied and arranged that the tube arrangement, as well as also shown schematically in FIGS. 7A and 7B, has a first imaginary connecting axis z1, which connects a center of the flow opening 21-1 and a center of the flow opening 22-1 imaginarily with one another, a second imaginary connecting axis z2, which connects a center of the flow opening 21-2 and a center of the flow opening 22-2 imaginarily with one another, a third imaginary connecting axis z3, which connects a center of the flow opening 21-3 and a center of the flow opening 22-3 imaginarily with one another as well as a fourth imaginary connecting axis z4, which connects a center of the flow opening 21-4 and a center of the flow opening 22-4 imaginarily with one another, in such a manner that each imaginary connecting axis z1, z2, z3, z4 extends, in each case, in parallel with each of the others of the connecting axes z1, z2, z3, and z4. In an additional embodiment of the invention, —as well as also directly evident from FIGS. 7A, 7B, 8, 9A, and 9B—each of the tubes 111, 112, 121, 122 is so formed that it has, in each case, a first imaginary symmetry plane yz-111, yz-121, yz-112, and yz-122 corresponding, for example, to its imaginary longitudinal section plane, as well as perpendicular thereto, for example, a second imaginary symmetry plane xy-111, xy-121, xy-112, and xy-122 corresponding to an imaginary cross sectional plane, and is, in each case, mirror symmetric both to its first symmetry plane as well as also to its second symmetry plane. The tubes 111, 121, 112, 122 and the flow dividers 21, 22 can, furthermore, be so embodied and arranged that both the imaginary symmetry plane yz-111 extends in parallel with imaginary symmetry plane yz-121 and the imaginary symmetry plane yz-112 extends in parallel with imaginary symmetry plane yz-122 and/or that the imaginary symmetry plane yz-111 coincides with the imaginary symmetry plane yz-112 as well as also the imaginary symmetry plane yz-121 coincides with the imaginary symmetry plane yz-122. In an additional embodiment, the tubes 111, 121, 112, 122 and the flow dividers 21, 22 are, furthermore, so embodied and arranged that the tube arrangement has, located both between the tube 111 and the tube 121 as well as also between the tube 112 and the tube 122, at least a first imaginary symmetry plane yz, relative to which the tube arrangement is, as well as also directly evident from FIGS. 8 and 9A, or its combination, mirror symmetric. The tube arrangement can—, as well as also directly evident from FIGS. 7A, 7B, 8, 9A and 9B—, furthermore, be so embodied that its first symmetry plane yz is oriented, for example, in parallel with each of the above described symmetry planes yz-111, yz-121, yz-112, yz-122 of the tubes 111, 121, 112, and 122 and/or is arranged, in each case, with the same separation from each of the above described symmetry planes yz-111, yz-121, yz-112, yz-122 of the tubes 111, 121, 112, and 122; this, for example, also in such a manner that the two tubes 111, 121 are parallel to one another, and to the imaginary symmetry plane yz of the tube arrangement and/or that the two tubes 111, 121 lie in a shared first tube plane and the tubes 121, 122 lie in a shared second tube plane. Thus, according to an additional embodiment of the invention, the tube 111 has relative to the imaginary symmetry plane yz of the tube arrangement a smallest separation, which equals a smallest separation, which the tube 112 has relative to the imaginary symmetry plane yz and/or the tube 121 has relative to the imaginary symmetry plane yz of the tube arrangement a smallest separation, which equals a smallest separation, which the tube 122 has relative to the imaginary symmetry plane yz. In an additional embodiment of the invention, it is, furthermore, provided that the tube arrangement has in addition to the above described first imaginary symmetry plane yz a second imaginary symmetry plane xy perpendicular thereto and, equally as well, imaginarily intersecting each of the tubes and is also mirror symmetric relative to the second imaginary symmetry plane xy.

In an embodiment of the invention, each of the tubes 111, 121, 112, 122 of the tube arrangement is, in each case, adapted to convey fluid in its lumen, especially, in each case, a volume portion of the fluid FL1 to be measured, and during that to be caused to vibrate, for example, in each case, to execute forced mechanical oscillations about an associated static rest position—especially oscillations effecting a measurable effect corresponding to the at least one measured variable and/or excited by means of the exciter mechanism—; this, especially, in such a manner that each of the tubes of the tube arrangement is caused to vibrate and during that to be flowed through by fluid starting from its first end and flowing in the direction of its second end. The forced mechanical oscillations can, such as quite usual in the case of measuring transducers of the type being discussed, be at least in part forced bending oscillations of the tubes about an imaginary oscillation axis of the tube arrangement, namely an imaginary oscillation axis imaginarily intersecting the tube; this, especially, also in such a manner that the above described (four) imaginary oscillation axes—, for example, in the case of tubes located in static rest position—are essentially parallel relative to one another and/or to the above described imaginary connecting axes z1, z2, z3, z4.

The exciter mechanism is, according to an embodiment of the invention, especially provided, and adapted, to convert supplied electrical power into forced mechanical oscillations, for example, bending oscillations, of the tubes of the tube arrangement about their static rest positions, while the sensor arrangement is especially provided, and adapted, to register mechanical oscillations of the tubes, not least of all mechanical oscillations and/or bending oscillations of the tubes brought about by means of the exciter mechanism, and to provide a first oscillation measuring signal s41, a second oscillation measuring signal s42, a third oscillation measuring signal s43 as well as a fourth oscillation measuring signal s44. These—, for example, electrical—oscillation measuring signals s41, s42, s43, s44 each show, at least in part, oscillatory movements of one or more of the tubes 111, 121, 112, 122 of the tube arrangement, for example, in each case, by means of a variable electrical voltage corresponding with oscillatory movements of the tubes; this, especially, in such a manner that the first and second oscillation measuring signals s41, s42 follow a change of a mass flow rate of the measured substance guided in the tube arrangement with a change of a first phase difference, namely a change of a difference between a phase angle of the oscillation measuring signal s41 and a phase angle of the oscillation measuring signal s42 and the third and fourth oscillation measuring signals s43, s44 follow a change of a mass flow rate of the measured substance guided in the tube arrangement with a change of a second phase difference, namely a change of a difference between a phase angle of the oscillation measuring signal s43 and a phase angle of the oscillation measuring signal s44, and/or in such a manner that each of the above described oscillation measuring signals s41, s42, s43, s44 follows a change of a density of the measured substance guided in the tube arrangement with a change of a signal frequency of at least one spectral signal component. For exciting and maintaining forced mechanical oscillations of the tubes, the exciter mechanism includes, according to an additional embodiment of the invention, a—, for example, electrodynamic—first oscillation exciter 31 as well as at least a—, for example, electrodynamic and/or equally embodied to the first oscillation exciter 31—second oscillation exciter 32. As also indicated in FIGS. 3A, 3B, 6A, 6B, 7A and 7B, or directly evident from their combination, an option is, for example, to connect the oscillation exciter 31 mechanically with each of the two tubes 111, 121 and the oscillation exciter 32 with each of the two tubes 112, 122. Each of the two oscillation exciters 31, 32 is, according to an embodiment of the invention, furthermore, provided, and adapted, to convert electrical power supplied by the measuring- and operating electronics ME into mechanical power effecting forced mechanical oscillations of the tubes 111, 121, or 112, 122, connected with the oscillation exciter 31, or 32, as the case may be; this, especially, in such a manner that the oscillation exciter 31 acts differentially on the two tubes 111, 121, namely can introduce, or introduces, only opposite-equal excitation forces into the two tubes 111, 121 and the oscillation exciter 32 acts differentially on the two tubes 112, 122, namely can introduce, or introduces, only opposite-equal excitation forces into the two tubes 112, 122.

For producing the above described oscillation measuring signals s41, s42, s43, s44, the sensor arrangement according to an additional embodiment of the invention includes a, for example, electrodynamic, first oscillation sensor 41 for the oscillation measuring signal s41, a—, for example, electrodynamic and/or embodied equally to the first oscillation sensor 41—second oscillation sensor 42 for the oscillation measuring signal s42, a—for example, electrodynamic and/or embodied equally to the first oscillation sensor 41—third oscillation sensor for the oscillation measuring signal s43 as well as at least a—for example, electrodynamic and/or embodied equally to the third oscillation sensor 43—fourth oscillation sensor 44 for the oscillation measuring signal s44. As also indicated in FIGS. 3A, 3B, 6A, 6B, 7A, and 7B, or directly evident from their combination, an option is, for example, to connect both the oscillation sensor 41 as well as also the oscillation sensor 42 mechanically with each of the two tubes 111, 121 and, for example, both the oscillation sensor 43 as well as also the oscillation sensor 44 with each of the two tubes 112, 122, for example, in such a manner that the oscillation sensor 41 and the oscillation sensor 43, in each case, register inlet side, oscillatory movements of the tubes 111, 121, 112, 122 and the oscillation sensor 42 and the oscillation sensor 44, in each case, register outlet side, oscillatory movements of the tubes 111, 121, 112, 122. For example, the oscillation sensors can also be positioned in such a manner that the oscillation sensor 41 is spaced the same distance from the flow divider 21 as the oscillation sensor 42 is from the flow divider 22 and/or the oscillation sensor 43 is spaced the same distance from the flow divider 21 as the oscillation sensor 44 is from the flow divider 22, and/or in such a manner that the two oscillation sensors 41, 42 are positioned spaced equally far from the oscillation exciter 31 and/or the two oscillation sensors 43, 44 are positioned spaced equally far from the oscillation exciter 32. In an additional embodiment of the invention, each of the above described oscillation sensors 41, 42 is, furthermore, provided, and adapted, to register opposite, in given cases, also opposite-equal, oscillatory movements of the tubes 111, 121 and to convert such into the oscillatory movement representing, oscillation measuring signals s41, s42 and each of the above described oscillation sensors 43, 44 is, furthermore, provided, and adapted, to register opposite, in given cases, also opposite-equal, oscillatory movements of the tubes 112, 122 and to convert such into the oscillatory movement representing, oscillation measuring signals s43, s44; this, especially, in such a manner that each of the oscillation sensors 41, 42 differentially registers the oscillatory movements of the two tubes 111, 121, namely only converts opposed oscillatory movements of the tubes 111, 121 into the oscillation measuring signal, and each of the oscillation sensors 43, 44 differentially registers the oscillatory movements of the two tubes 112, 122, namely only converts opposed oscillatory movements of the tubes 112, 122 into the oscillation measuring signal. For lessening the number of required connection lines to the measuring- and operating electronics ME, the two oscillation sensors 41, 43 can be connected electrically in series, in such a manner that the two oscillation measuring signals s41, s43 superimpose on one another, and/or the two oscillation sensors 42, 44 can be connected electrically in series, in such a manner that the two oscillation measuring signals s42, s44 superimpose on one another.

Figure 3A:
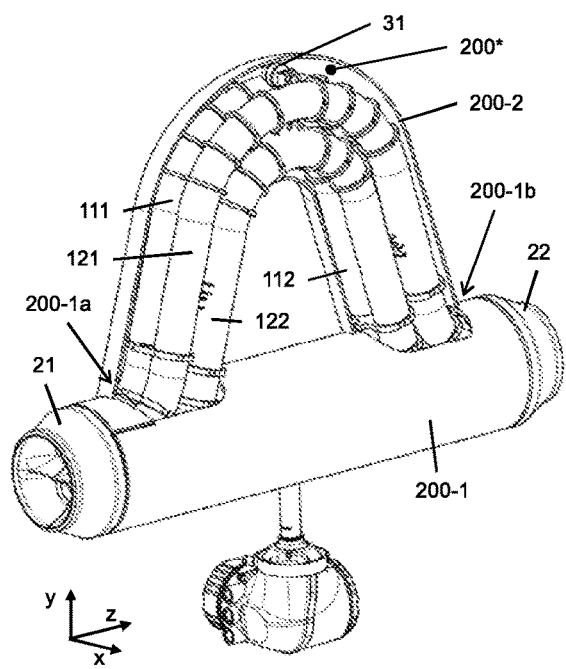
FIGS. 3A, 3B show different, partiality sectioned and/or perspective, side views of a measuring transducer suitable for a vibronic measuring system of FIG. 1, 2A, or 2B.
Figure 3B:
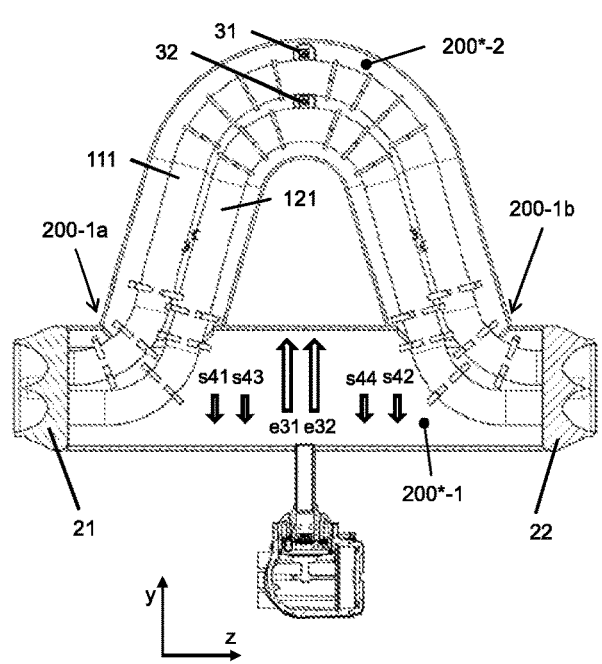
Figure 4:
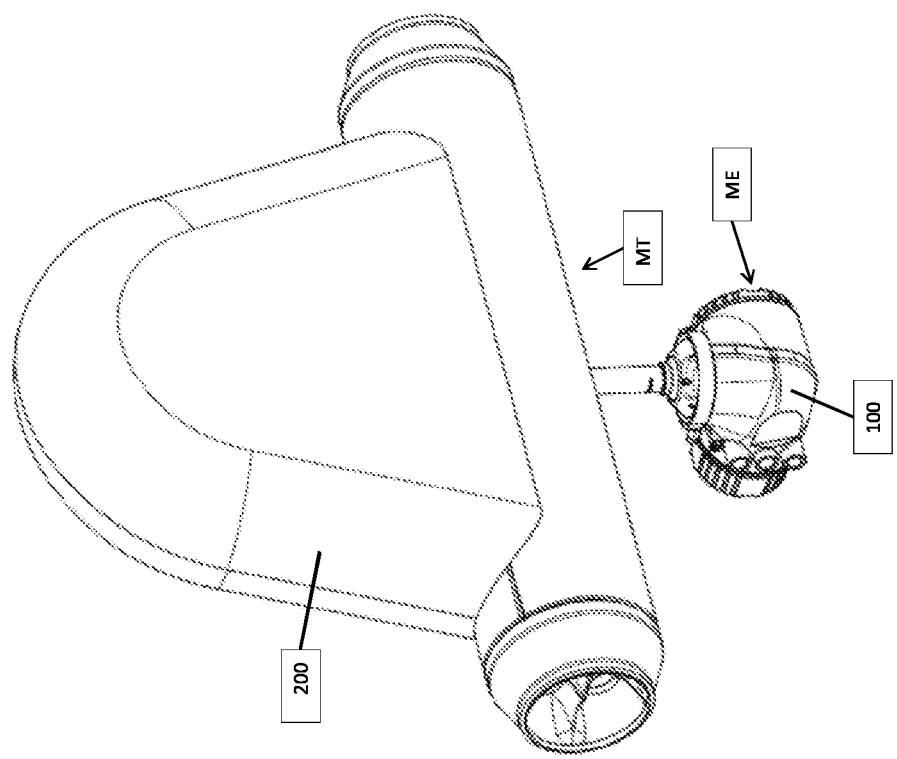
Figure 6A:
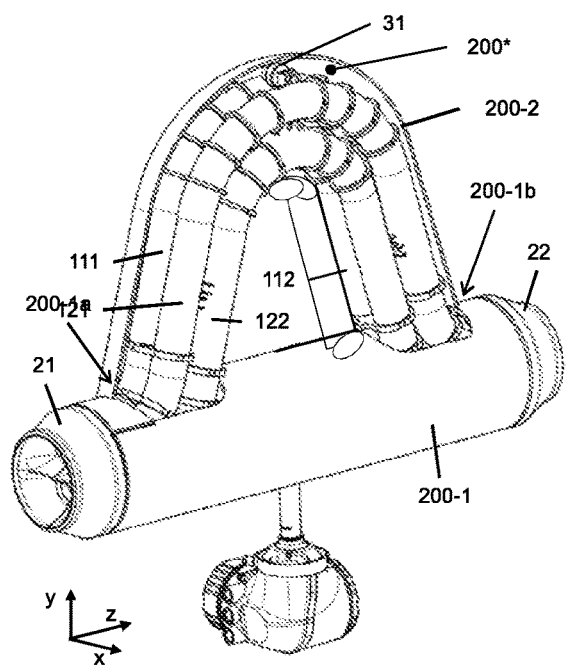
FIG. 6A, 6B show different, partiality sectioned and/or perspective, side views of a measuring transducer suitable for a vibronic measuring system of FIG. 4, 5A, or 5B.
Figure 6B:
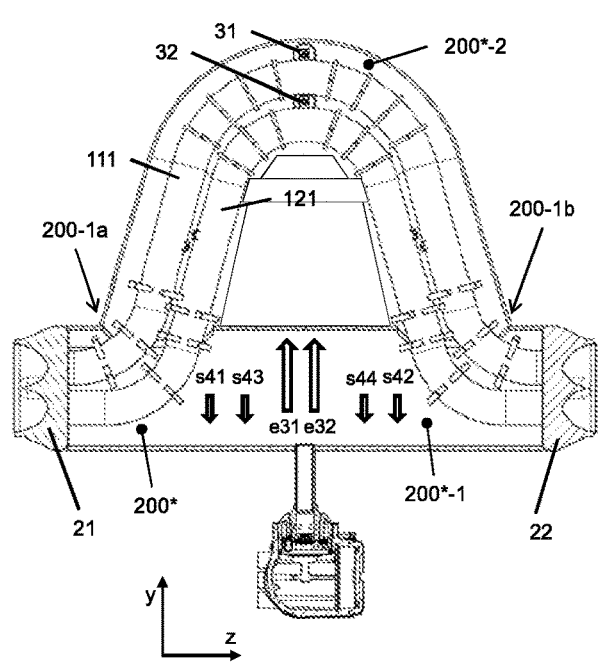

Besides the measuring transducer MT, the measuring system of the invention, comprises furthermore, a measuring- and operating electronics ME electrically coupled both to the above described exciter mechanism of the measuring transducer as well as also to the above described sensor arrangement of the measuring transducer. The measuring- and operating electronics ME can, for example, be formed by means of at least one microprocessor and/or by means of at least one digital signal processor and/or be electrically coupled both with exciter mechanism 30 as well as also the sensor arrangement, in each case, by means of electrical connection lines. Moreover, the measuring- and operating electronics ME can, as well as also indicated in FIGS. 1, 2A and 2B, and 4, 5A, 5B, in each case, be accommodated in a protective electronics housing 100, especially an explosion-, or pressure resistant housing and/or a housing protecting the measuring- and operating electronics ME against water spray. In an additional embodiment of the invention, the measuring- and operating electronics is adapted, as well as also indicated in FIGS. 3B, and 6B, at least at times, to generate an electrical, first driver signal e31 and therewith to supply electrical power to the exciter mechanism, in such a manner that both the tube 111 as well as also the tube 121, in each case, executes, at least in part, wanted oscillations, namely forced mechanical oscillations having a first wanted frequency, namely a oscillation frequency predetermined by the driver signal e31. Moreover, the measuring—and operating electronics is, furthermore, adapted, at least at times—, for example, simultaneously with the driver signal e31—to generate an electrical, second driver signal e32 and therewith to supply electrical power into the exciter mechanism, in such a manner that both the tube 112 as well as also the tube 122 execute—for example, also simultaneously with the other two tubes 111, 121—, in each case, at least in part, wanted oscillations, namely forced mechanical oscillations having at least one, for example, differing from the first wanted frequency, second wanted frequency, namely an oscillation frequency predetermined by the electrical driver signal e32. The above-mentioned first wanted frequency can correspond, for example, to a first resonant frequency of the tube arrangement dependent on the density of the fluid FL1 guided in the tube arrangement—, for example, a lowest shared resonant frequency of a first tube pair formed by means of the tubes 111, 121—and the above-mentioned second wanted frequency can, for example, correspond to a second resonant frequency of the tube arrangement dependent on the density of the fluid FL1 guided in the tube arrangement, in given cases, a second resonant frequency also differing from the first resonant frequency, —for example, a lowest shared resonant frequency of a second tube pair formed by means of the tubes 112, 122. Additionally, the measuring- and operating electronics can also be provided, and adapted, to receive and to evaluate the above described oscillation measuring signals s41, s42, s43, s44, namely, based on their above referenced first phase difference and/or based on their above referenced second phase difference, to generate mass flow-measured values representing the mass flow rate of the fluid FL1 and/or, based at least on one signal frequency of at least one of the oscillation measuring signals s41, s42, s43, s44, for example, based on a signal frequency of at least one of the oscillation measuring signals s41, s42 corresponding to the above described first wanted frequency and/or based on a signal frequency at least one of the oscillation measuring signals s43, s44 corresponding to the above described second wanted frequency, to generate density measured values representing the density of the fluid FL1. Alternatively or supplementally, the measuring- and operating electronics can also be provided, and adapted, based at least on one of the oscillation measuring signals s41, s42, s43, s44, and/or at least one of the above described driver signals e31, e32, to generate viscosity-measured values representing the viscosity of the fluid FL1.

Figure 10:
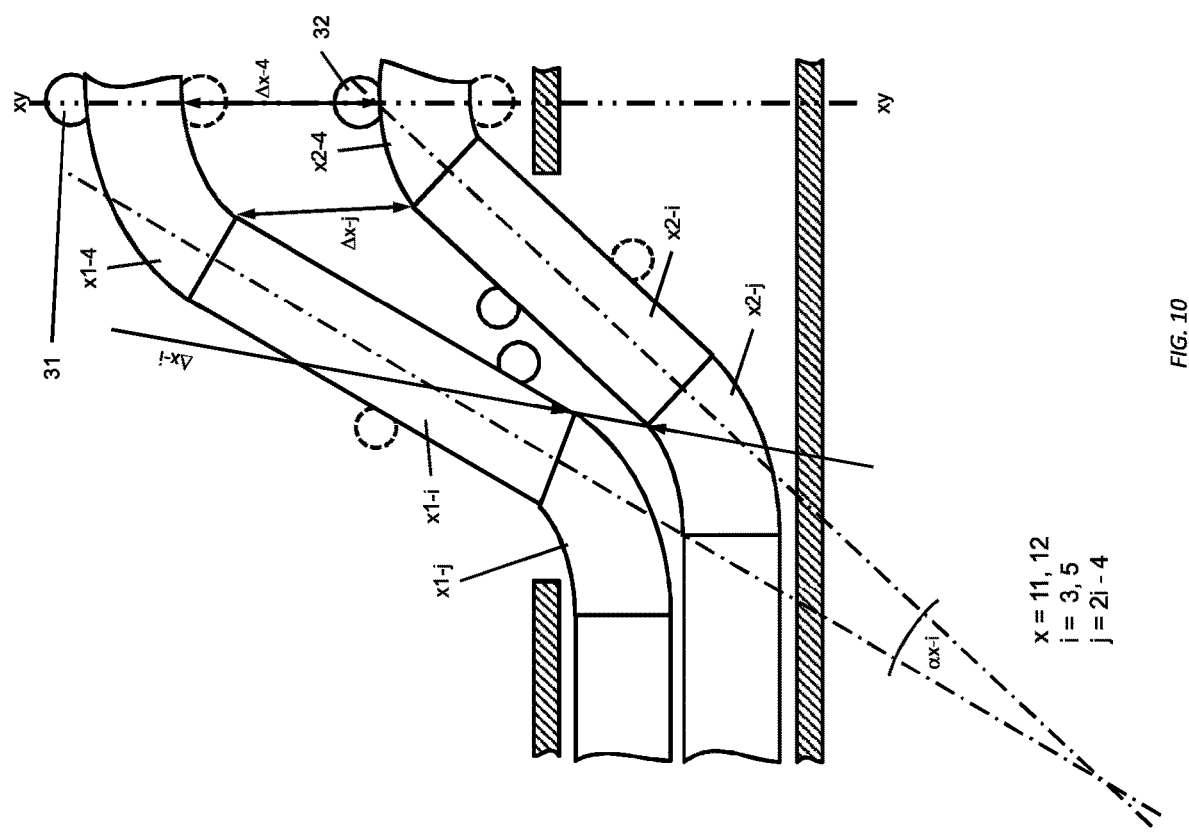
FIG. 10 shows schematically, partial views of a tube arrangement of FIGS. 7A, 7B, 8, and 9A.

In the case of the measuring transducer of the invention (and the measuring system formed therewith)—, as well as also shown schematically in FIGS. 7A, 7B and 10, and directly evident from their combination—each of the tubes 111, 112, 121, 122 of the tube arrangement has, especially, at least one straight, for example, hollow cylindrical, first segment 111-1, 121-1, 112-1, 122-1 connected with the flow divider 21, for example, by material bonding and/or force- and/or shape interlocking, an arc shaped, for example, circular arc shaped, second segment 111-2, 121-2, 112-2, 122-2 following the first segment 111-1, 121-1, 112-1, 122-1, a straight, for example, hollow cylindrical, third segment 111-3, 121-3, 112-3, 122-3 following the second segment 111-2, 121-2, 112-2, 122-2, an arc shaped, for example, circular arc shaped, fourth segment 111-4, 121-4, 112-4, 122-4 following the third segment 111-3, 121-3, 112-3, 122-3, a straight, for example, constructed equally to the third segment 111-3, 121-3, 112-3, 122-3 and/or hollow cylindrical, fifth segment 111-5, 121-5, 112-5, 122-5 following the fourth segment 111-4, 121-4, 112-4, 122-4, an arc shaped, for example, constructed equally to the second segment 111-2, 121-2, 112-2, 122-2 and/or circular arc shaped, sixth segment 111-6, 121-6, 112-6, 122-6 following the fifth segment 111-5, 121-5, 112-5, 122-5 as well as a straight, for example, constructed equally to the first segment 111-1, 121-1, 112-1, 122-1 and/or hollow cylindrical, seventh segment 111-7, 121-7, 112-7, 122-7 both following the sixth segment 111-6, 121-6, 112-6, 122-6 as well as also connected with the flow divider 22, for example, by material bonding and/or force- and/or shape interlocking. For the above described case, in which the tube arrangement has both the symmetry plane yz as well as also the symmetry plane xy perpendicular thereto, according to an additional embodiment of the invention, it is, furthermore, provided that the symmetry plane xy—, as well as also directly evident from a combination FIGS. 7A, 7B and 10—imaginarily intersects each of the tubes, in each case, in their fourth segment 111-4, 121-4, 112-4, 122-4. In an additional embodiment of the invention, each of the tubes, as well as also in FIG. 9B indicated, or also directly evident from a combination of FIGS. 7A, 7B, 9A and 9B, has, in each case, a tube arc height h111, h121, h112, h122, measured within the above described symmetry plane xy as a smallest distance between its fourth segment 111-4, 121-4, 112-4, 122-4 and its imaginary connecting axis z1, z2, z3, z4, namely its axis imaginarily connecting its first and second ends, which tube arc height is, in each case, so selected that each of the tubes 111, 121, 112, 122 has, in each case, a tube length to tube arc height-ratio, measured as a quotient of the tube length of the tube to the tube arc height, which is greater than 2 (2:1), for example, greater than 2.5 (2.5:1), and less than 4 (4:1), for example, less than 3 (3:1), and/or that each of the tubes 111, 121, 112, 122 has, in each case, a caliber to-tube arc height-ratio, measured as a quotient of the caliber of the tube to the tube arc height, which is greater than 0.1, for example, also less than 0.2.

For the case, in which the sensor arrangement is formed by means of the above described four oscillation sensors 41, 42, 43, 44, for example, —, as well as also shown in FIGS. 7A, 7B, and 10, or evident from their combination—the oscillation sensor 41 is mounted spaced both from the segment 111-2 as well as also from the segment 111-4 on the segment 111-3 of the tube 111 as well as spaced both from the segment 121-2 as well as also from the segment 121-4 on the segment 121-3 of the tube 121, the oscillation sensor 42 is mounted spaced both from the segment 111-6 as well as also from the segment 111-4 on the segment 111-5 of the tube 111 as well as spaced both from the segment 121-6 as well as also from the segment 121-4 on the segment 121-5 of the tube 121, the oscillation sensor 43 is mounted spaced both from the segment 112-2 as well as also from the segment 112-4 on the segment 112-3 of the tube 112 as well as spaced both from the segment 122-2 as well as also from the segment 122-4 on the segment 122-3 of the tube 122, and the oscillation sensor 44 is mounted spaced both from the segment 112-6 as well as also from the segment 112-4 on the segment 112-5 of the tube 112 as well as spaced both from the segment 121-6 as well as also from the segment 122-4 on the segment 122-5 of the tube 122; this, for example, also in such a manner that the oscillation sensor 41 is positioned both in part between the segment 111-3 and the segment 112-3 as well as also in part between the segment 121-3 and the segment 122-3 and the oscillation sensor 42 is positioned both in part between the segment 111-5 and the segment 112-5 as well as also in part between the segment 121-5 and the segment 122-5 and/or that the oscillation sensor 43 is positioned both in part between the segment 111-3 and the segment 112-3 as well as also in part between the segment 121-3 and the segment 122-3 and the oscillation sensor 44 is positioned both in part between the segment 111-5 and the segment 112-5 as well as also in part between the segment 121-5 and the segment 122-5. Additionally, the oscillation sensors 41, 42 can both be spaced, in each case, equally far from the segment 111-4 as well as also, in each case, equally far from the segment 121-4 and/or the oscillation sensors 43, 44 can both be spaced, in each case, equally far from the segment 112-4 as well as also, in each case, equally far from the segment 122-4. For the other the case, in which the exciter mechanism is formed by means of the above described two oscillation exciters 31, 32, an option is, for example, —, as well as also shown in FIGS. 7A, 7B, and 10, or evident from their combination—that the oscillation exciter 31 can be mounted spaced both from the segment 111-3 as well as also from the segment 111-5 on the segment 111-4 of the tube 111 as well as spaced both from the segment 121-3 as well as also from the segment 121-5 on the segment 121-4 of the tube 121-4 and the oscillation exciter 32 can be mounted spaced both from the segment 112-3 as well as also from the segment 112-5 on the segment 112-4 of the tube 112 as well as spaced both from the segment 122-3 as well as also from the segment 122-5 on the segment 122-4 of the tube 122; this, for example, also in such a manner that the oscillation exciter 31 is spaced equally far both from the segment 111-3 and from the segment 111-5 of the tube 111 as well as also from the segment 121-3 and from the segment 121-5 of the tube 121 and/or that the oscillation exciter 32 is spaced equally far both from the segment 112-3 and from the segment 112-5 of the tube 112 as well as also from the segment 122-3 and from the segment 122-5 of the tube 122.

In the case of the measuring transducer of the invention, the two tubes 111, 112 are, furthermore, so embodied and positioned that—such as shown in FIG. 7A—an imaginary longitudinal axis of the straight segment 111-3 of the tube 111 as well as an imaginary longitudinal axis of the straight segment 112-3 of the tube 112 enclose (at least in projection onto the above-mentioned imaginary symmetry plane yz of the tube arrangement—here also corresponding to the plane of the drawing of FIG. 7A—) upon extension, a first angle of intersection $\alpha 11\text{-}3$ and an imaginary longitudinal axis of the straight segment 111-5 of the tube 111 as well as an imaginary longitudinal axis of the straight segment 112-5 of the tube 112 enclose (at least in projection onto the above-mentioned imaginary symmetry plane yz of the tube arrangement) upon extension, a second angle of intersection $\alpha 11\text{-}5$. Equally, also the two other two tubes 121, 122 are so embodied that—such as shown in FIG. 7B—an imaginary longitudinal axis of the segment 121-3 of the tube 121 as well as an imaginary longitudinal axis of the segment 122-3 of the tube 122 enclose (at least in projection onto the above-mentioned imaginary symmetry plane yz the tube arrangement—here also corresponding to the plane of the drawing of FIG. 7B—) upon extension, a second angle of intersection $\alpha 12\text{-}3$ and an imaginary longitudinal axis of the segment 121-5 of the tube 121 and an imaginary longitudinal axis of the segment 122-5 of the tube 122 enclose (at least in projection onto the above-mentioned imaginary symmetry plane yz of the tube arrangement) upon extension, a fourth angle of intersection $\alpha 12\text{-}5$. Each of the above described angles of intersection $\alpha 11\text{-}3$, $\alpha 11\text{-}5$, $\alpha 12\text{-}3$, $\alpha 12\text{-}5$ is acute, namely greater than 0° and less than 90°. At least the two angles of intersection $\alpha 11\text{-}3$, $\alpha 11\text{-}5$ can, for example, also be equally large. Alternatively or supplementally, also the two angles of intersection $\alpha 12\text{-}3$, $\alpha 12\text{-}5$ can be equally large. In an additional embodiment of the invention, it is, furthermore, provided that each of the above described angles of intersection $\alpha 11\text{-}3$, $\alpha 11\text{-}5$, $\alpha 12\text{-}3$ and $\alpha 12\text{-}5$ is, in each case, greater than 0.1°—, for example, not less than 0.2°—and less than 10°—, for example, not greater than 5°—.

As directly evident from a combination FIGS. 7A, 7B and 10, in the case of the measuring transducer of the invention, the tubes 111, 121, 112, 122 are, additionally, so embodied and arranged that a smallest separation $\Delta 11\text{-}4$ between the arc shaped segment 111-4 of the tube 111 and the arc shaped segment 112-4 of the tube 112 is both greater than a smallest separation $\Delta 11\text{-}3$ between the straight segment 111-3 of the tube 111 and the arc shaped segment 112-2 of the tube 112 as well as also greater than a smallest separation $\Delta 11\text{-}5$ between the straight segment 111-5 of the tube 111 and the arc shaped segment 112-6 of the tube 112 and, equally, also a smallest separation $\Delta 12\text{-}4$ between the arc shaped segment 121-4 of the tube 121 and the arc shaped segment 122-4 of the tube 122 is both greater than a smallest separation $\Delta 12\text{-}3$ between the straight segment 121-3 of the tube 121 and the arc shaped segment 122-2 of the tube 122 as well as also greater than a smallest separation $\Delta 12\text{-}5$ between the straight segment 121-5 of the tube 121 and the arc shaped segment 122-6 of the tube 122; this, for example, also in such a manner that the oscillation exciter 31 can—as well as also indicated in FIG. 10—be positioned both in part between the segment 111-4 of the tube 111 and the segment 112-4 as well as also in part between the segment 121-4 and the segment 122-4 and/or that the oscillation exciter 32 can—as well as also indicated in FIGS. 7A, 7B and 10, be positioned both in part between the segment 111-4 and the segment 112-4 as well as also in part between the segment-121-4 and the segment 122-4.

In an additional embodiment of the invention, the tubes of the tube arrangement are so embodied and arranged that the above-mentioned smallest separation $\Delta 11\text{-}3$, amounting to, for example, less than 50 mm, between the segment 111-3 of the tube 111 and the segment 112-2 of the tube 112 and the above-mentioned smallest separation $\Delta 11\text{-}5$, amounting to, for example, less than 50 mm, between the segment 111-5 of the tube 111 and the segment 112-6 of the tube 112 are equally large, or that the above-mentioned smallest separation Δ12-3 between the segment 121-3 of the tube 121 and the segment 122-2 of the tube 122 and the above-mentioned smallest separation Δ12-5 between the segment 121-5 of the tube 121 and the segment 122-6 of the tube 122 are equally large. Alternatively or supplementally, the tubes 111, 121, 112, 122 can—as well as also indicated in FIG. 10—additionally, be so embodied and arranged that both a smallest separation Δ11-2 between the arc shaped segment 111-4 of the tube 111 and the straight segment 112-3 of the tube 112 (and between the arc shaped segment 112-4 of the tube 112 and the straight segment 111-3 of the tube 111) is greater than the above-mentioned smallest separation Δ11-3 as well as also a smallest separation Δ11-6 between the arc shaped segment 111-4 of the tube 111 and the straight segment 112-5 of the tube 112 (and between the arc shaped segment 112-4 of the tube 112 and the straight segment 111-5 of the tube 111) is greater than the above-mentioned smallest separation Δ11-5 and, equally, both a smallest separation Δ12-2 between the arc shaped segment 121-4 of the tube 121 and the straight segment 122-3 of the tube 122 (and between the arc shaped segment 122-4 of the tube 122 and the straight segment 121-3 of the tube 121) is greater than the above-mentioned smallest separation Δ12-3 as well as also a smallest separation Δ12-6 between the arc shaped segment 121-4 of the tube 121 and the straight segment 112-5 of the tube 112 (and between the arc shaped segment 112-4 of the tube 122 and the straight segment 121-5 of the tube 121) is greater than the above-mentioned smallest separation Δ12-5. In an additional embodiment of the invention, it is, furthermore, provided that the above-mentioned smallest separation Δ11-4 amounts to less than 10-times the above described smallest distance Δ11-3 and the above described smallest distance Δ11-5 and/or amounts to less than the sum of a caliber of the tube 111 and a caliber of the tube 112, and that the above-mentioned smallest separation Δ12-4 amounts to less than 10 times the above described smallest distance Δ12-3 and the above described smallest distance Δ12-5 and/or amounts to less than the sum of a caliber of the tube 121 and a caliber of the tube 122.

For protecting the tubes of the tube arrangement as well as accompanying other components of the measuring transducer—not least of all the above described oscillation exciters 31, 32, and oscillation sensors 41, 42, 43 44—against damaging environmental influences, for preventing undesired sound emissions from the vibrating tubes and even for accommodating fluid escaping from a leaking tube arrangement, the measuring transducer comprises, as well as also quite usual in the case of measuring transducers of the type being discussed, or measuring system formed therewith, according to an additional embodiment of the invention, a transducer housing 200 jacketing the tubes 111, 121, 112, 122 of the tube arrangement. Transducer housing 200 includes a cavity 200*, for example, a hermetically sealed cavity, within which—as well as also evident from FIGS. 1, 2A, 2B, 3A and 3B, or 4, 2A, 5B, 6A and 6B—each of the tubes 111, 121, 112, 122 of the tube arrangement is arranged. The transducer housing can, for example, have a pressure resistance, which is greater than a greatest pressure resistance of the tubes of the tube arrangement and/or which amounts to greater than 50 bar.

In the case of the examples of embodiments illustrated in FIGS. 1, 2A, 2B, 3A, 3B, 4, 2A, 5B, 6A and 6B, the transducer housing 200 comprises a support element 200-1 extending from a first end to a second end with a support element length, wherein the support element 200-1 is mechanically connected, especially by material bonding, at its first end with the first flow divider and at its second end with the second flow divider. Support element 200-1 includes a hollow space 200*-1 surrounded by a, for example, metal, wall and forming a portion of the above described cavity 200* of the transducer housing 200 and can be embodied, for example, essentially cylindrically, in given cases, also at least sectionally hollow cylindrically, or tubularly. The wall of the support element 200-1 can be, for example, of a steel, for example, a stainless steel or a structural steel, and/or of the same material as the wall of the tubes 111, 121, 112, 122. The support element can, among other things, serve during operation of the measuring system to accommodate mechanical forces and/or moments introduced into the measuring transducer via a connected process line, especially in such a manner that of the forces and/or moments no or only very small fractions, namely fractions negligible for the desired accuracy of measurement of the measuring system, are transferred to the tube arrangement arranged within the transducer housing. Besides the support element, the transducer housing 200 includes in the case of the examples of embodiments shown here, furthermore, an envelope element 200-2, which is connected mechanically, for example, by material bonding, with the support element 200-1 of the transducer housing. The envelope element 200-2 can, as well as also evident from a combination of FIGS. 1, 2A, 3A and 3B, be embodied, for example, tubularly, in such a manner that it has a hollow space 200*-2, especially an in part circularly cylindrical hollow space, surrounded by a wall and forming a portion of the above described cavity 200*. Alternatively thereto, the envelope element 200-2 can, as well as also evident from a combination of FIGS. 4, 5A, 6A and 6B, be embodied, for example, also cap shaped, in such a manner that a wall of the envelope element together with a segment of the wall of the support element form, or envelop, the above described hollow space 200*-2. As also evident from FIGS. 3A, 3B, and 6A, 6B, the transducer housing and the tube arrangement are, furthermore, so embodied that each of the tubes 111, 121, 112, 122 of the tube arrangement is only in part arranged within the hollow space 200*-1 of the support element 200-1, and each of the tubes 111, 121, 112, 122 is only in part arranged within the hollow space 200*-2 of the envelope element 200-2; this—such as directly evident from FIGS. 3A, 3B, and 6A, 6B—for example, also in such a manner that each of the segments 111-4, 121-4, 112-4, 122-4 of the tubes is arranged exclusively within the hollow space 200*-2 of the envelope element 200-2 and/or that each of the segments 111-3, 121-3, 112-3, 122-3, 111-5, 121-5, 112-5, 122-5 of the tubes is arranged at least predominantly within the hollow space 200*-2 of the envelope element 200-2 and/or that each of the segments 111-2, 121-2, 112-2, 122-2, 111-6, 121-6, 112-6, 122-6 of the tubes is arranged at least predominantly outside of the hollow space 200*-2 of the envelope element 200-2, and that, conversely, each of the second segments 111-2, 121-2, 112-2, 122-2, 111-6, 121-6, 112-6, 122-6 of the tubes is arranged at least predominantly within the hollow space 200*-1 of the support element 200-1 and/or that each of the segments 111-3, 121-3, 112-3, 122-3, 111-5, 121-5, 112-5, 122-5 of the tubes is arranged at least predominantly outside of the hollow space 200*-1 of the support element 200-1. For lateral leading of the tubes 111, 121, 112, 122 through the support element 200-1, its wall has, according to an additional embodiment of the invention, a first opening 200-1a as well as at least a second opening 200-1b spaced from the opening 200-1a along an imaginary surface element of the wall. As directly evident from FIGS.

3A, 3B, and 6A, 6B, each of the two openings 200-1a, 200-1b forms, in each case, a portion of the above described cavity 200* of the transducer housing 200. Additionally, each of the tubes 111, 121, 112, 122 of the tube arrangement extends, in each case, both from the opening 200-1a as well as also from the opening 200-1b.

For the purpose of preventing measurement damaging contacts of the vibrating tubes among one another or with the transducer, housing, each of the tubes 111, 121, 112, 122 has only such distances to the other tubes, as well as also to the transducer housing 200, not least of all also to the edges of the two previously indicated openings 200-1a, 200-1b in the wall of the support element 200-1, which in each case enable under all operating conditions free oscillations with oscillation amplitude sufficient for measurement. In an embodiment of the invention, consequently, each of the tubes 111, 121, 112, 122 of the tube arrangement, in each case, has a smallest separation from the transducer housing 200 and/or a smallest separation from each of the other tubes 111, 121, 112, 122, which is greater than 5 mm. Accordingly, each of the tubes has also, in each case, a smallest separation from an edge of the opening 200-1a, and, in each case, a smallest separation from an edge of the opening 200-1b, which is greater than 5 mm. In order, on the other hand, also to be able to provide an as compact as possible measuring transducer, according to an additional embodiment, it is provided to keep one or more, in given cases, also each, of the above described smallest separations less than 10 mm. In an additional embodiment of the invention, it is, furthermore, provided that both within the opening 200-1a as well as also within the opening 200-1b, as well as also evident from FIGS. 3B, 6B and 10, a smallest separation between the tube 111 and the tube 112 is less than the above-mentioned smallest separation between the segment 111-4 of the tube 111 and the segment 112-4 of the tube 112, and that both within the opening 200-1a as well as also within the opening 200-1b a smallest separation between the tube 121 and the tube 122 is less than the above-mentioned smallest separation between the fourth segment 121-4 of the tube 121 and the segment 122-4 of the fourth tube 122.

The invention claimed is:

1. A measuring transducer for a vibronic measuring system serving for measuring at least one measured variable of a flowing fluid, in which the measuring transducer comprises:
    a transducer housing jacketing a tube arrangement, wherein the transducer housing has at least one cavity and wherein each tube of the tube arrangement is arranged within the cavity;
    a tube arrangement having:
        a bent first tube,
        a bent second tube embodied equally to the first tube,
        a bent third tube,
        a fourth tube embodied equally only to the third tube,
    a first flow divider with four flow openings, and
    a second flow divider embodied equally to the first flow divider or serving as a line junction or located outlet side with four flow openings;
    an exciter mechanism for exciting and maintaining mechanical oscillations of the tube arrangement, and
    a sensor arrangement for registering mechanical oscillations of the tube arrangement and for producing measuring signals representing oscillatory movements of one or more of the first, second, third and fourth tubes;
    wherein the transducer housing has a support element extending from a first end to a second end with a support element length, wherein the support element is connected mechanically at its first end with the first flow divider and at its second end with the second flow divider; wherein the support element has at least one hollow space forming a portion of the cavity and surrounded by a wall; wherein the wall of the support element has a first opening as well as at least a second opening spaced from the first opening along an imaginary surface element of the wall; wherein each of the first and second openings forms, in each case, a portion of the cavity of the transducer housing;
    wherein each of the first, second, third and fourth tubes extends with a tube length from a first end of each tube to a second end of each tube, has a lumen surrounded by a tube wall, and extends from the first end of the tube to the second end of the tube;
    wherein each of the first, second, third and fourth tubes is connected, in each case, to each of the first and second flow dividers in such a manner that
    the first tube communicates with its first end with a first flow opening of the first flow divider and with its second end with a first flow opening of the second flow divider,
    the second tube communicates with its first end with a second flow opening of the first flow divider and with its second end with a second flow opening of the second flow divider,
    the third tube communicates with its first end with a third flow opening of the first flow divider and with its second end with a third flow opening of the second flow divider,
    and the fourth tube communicates with its first end with a fourth flow opening of the first flow divider and with its second end with a fourth flow opening of the second flow divider;
    wherein each of the first, second, third and fourth tubes has, in each case, at least
    a straight first segment connected with the first flow divider,
    an arc shaped second segment following the first segment,
    a straight third segment following the second segment,
    an arc shaped fourth segment following the third segment and constructed equally to the third segment or hollow cylindrical,
    fifth segment following the arc shaped fourth segment, sixth segment
    constructed equally to the arc shaped second segment or circular arc shaped, sixth segment following the fifth segment, and
    a straight, constructed equally to the first segment or hollow cylindrical, seventh segment both following the sixth segment as well as al so connected, with the second flow divider;
    wherein a smallest separation between the fourth segment of the first tube and the fourth segment of the third tube is
    both greater than a smallest separation between the third segment of the first tube and the second segment of the third tube
    as well as also greater than a smallest separation between the fifth segment of the first tube and the sixth segment of the third tube;
    wherein a smallest separation between the fourth segment of the second tube and the fourth segment of the fourth tube is
    both greater than a smallest separation between the third segment of the second tube and the second segment of the fourth tube as well as greater than a smallest separation between the fifth segment of the second tube and the sixth segment of the fourth tube;

wherein an imaginary longitudinal axis of the third segment of the first tube as well as an imaginary longitudinal axis of the third segment of the third tube enclose first angle of intersection;

wherein an imaginary longitudinal axis of the third segment of the second tube as well as an imaginary longitudinal axis of the third segment of the fourth tube enclose onto a first imaginary symmetry plane of the tube arrangement, upon extension, a second angle of intersection;

wherein an imaginary longitudinal axis of the fifth segment of the first tube as well as an imaginary longitudinal axis of the fifth segment of the third tube enclose a third angle of intersection; and wherein an imaginary longitudinal axis of the fifth segment of the second tube and an imaginary longitudinal axis of the fifth segment of the fourth tube enclose a fourth angle of intersection;

wherein the smallest separation between the fourth segment of the first tube and the fourth segment of the third tube amounts to less than sum of a caliber of the first tube and a caliber of the third tube and the smallest separation between the fourth segment of the second tube and the fourth segment of the fourth tube amounts to less than sum of a caliber of the second tube and a caliber of the fourth tube;

wherein each of the first, second, third and fourth angles of intersection is, in each case, greater than 0.1° and less than 10°;

wherein each of the tubes has, in each case, a tube length to caliber-ratio, measured as a quotient of the tube length to the caliber, which is greater than 25 (25:1), and also less than 30 (30:1); and wherein both the tube length of the first tube as well as also the tube length of the second tube, in each case, is greater than the tube length of the third tube and, in each case, greater than the tube length of the fourth tube;

wherein each of the first, second, third and fourth tubes is arranged only in part within the hollow space of the support element in a manner that each of the second segments of each of the first, second, third and fourth tubes is arranged at least predominantly within the hollow space of the support element and each of the sixth segments of each of the first, second, third and fourth tubes is arranged at least predominantly within the hollow space of the support element and/or that each of the third and fifth segments of each of the first, second, third and fourth tubes is arranged at least predominantly outside of the hollow space of the support element;

wherein the wall of the support element has a first opening as well as at least a second opening spaced from the first opening along an imaginary surface element of the wall;

wherein each of the first and second openings forms, in each case, a portion of the cavity of the transducer housing; and wherein each of the first, second, third and fourth tubes extends, in each case, both from the first opening as well as also from the second opening.

2. The measuring transducer of claim 1, wherein each of the first, second, third and fourth angles of intersection is, in each case, greater than 0.1 and less than 10°; or wherein at least the first angle of intersection and the second angle of intersection are substantially equal; and/or wherein at least the third angle of intersection and the fourth angle of intersection are substantially equal; or wherein the smallest separation between the third segment of the first tube and the second segment of the third tube and the smallest separation between the fifth segment of the first tube and the sixth segment of the third tube are equally large and/or amount, in each case, to less than 50 mm; or wherein the smallest separation between the third segment of the second tube and the second segment of the fourth tube and the smallest separation between the fifth segment of the second tube and the sixth segment of the fourth tube are equally large amount, in each case, to less than 50 mm; or wherein the smallest separation between the fourth segment of the first tube and the fourth segment of the third tube amounts to less than 10 times the smallest distance between the third segment of the first tube and the second segment of the third tube; or wherein the smallest separation between the fourth segment of the first tube and the fourth segment of the third tube amounts to less than 10 times the smallest distance between the fifth segment of the first tube and the sixth segment of the third tube; or wherein the smallest separation between the fourth segment of the first tube and the fourth segment of the third tube amounts to less than sum of a caliber of the first tube and a caliber of the third tube; or wherein the smallest separation between the fourth segment of the second tube and the fourth segment of the fourth tube amounts to less than sum of a caliber of the second tube and a caliber of the fourth tube.

\* \* \* \* \*